United States Patent [19]
Gold et al.

[11] Patent Number: 5,488,631
[45] Date of Patent: Jan. 30, 1996

[54] WIRELESS DIRECT-SEQUENCE SPREAD SPECTRUM TDMA COMMUNICATIONS SYSTEM

[75] Inventors: Kenneth S. Gold, Bell Canyon; Hubert M. France, Jr., Palos Verdes Estates, both of Calif.

[73] Assignee: Radio Connect Corporation, Culver City, Calif.

[21] Appl. No.: 331,925

[22] Filed: Oct. 31, 1994

[51] Int. Cl.⁶ .................................................. H04B 1/707
[52] U.S. Cl. ........................... 375/206; 375/200; 380/34
[58] Field of Search ................................. 375/1, 200–210; 380/34

[56] References Cited

U.S. PATENT DOCUMENTS

| | | | |
|---|---|---|---|
| 4,724,435 | 2/1988 | Moses et al. | 375/1 X |
| 4,975,926 | 12/1990 | Knapp | 375/1 |
| 4,984,247 | 1/1991 | Kaufmann et al. | 375/1 |
| 5,046,066 | 9/1991 | Messenger | 375/1 X |
| 5,151,920 | 9/1992 | Haagh et al. | 375/1 |
| 5,206,881 | 4/1993 | Messenger et al. | 375/1 |
| 5,231,646 | 7/1993 | Heath et al. | 375/1 |
| 5,276,703 | 1/1994 | Budin et al. | 375/1 |
| 5,285,469 | 2/1994 | Vanderpool | 375/1 |

Primary Examiner—Bernarr E. Gregory
Attorney, Agent, or Firm—Edward Gray

[57] ABSTRACT

A protocol for wireless direct user-to-user DSSS TDMA digital communication at a data rate of the order of one to several megabits per second in the 902–928 MHz, 2400–2483.5 MHz or 5725–5850 MHz band includes a sequence of transactions, each transaction consisting of a predetermined sequence of subpackets, and each subpacket consisting of a predetermined number of bytes preallocated to a subpacket element or element portion. Network communications among a plurality of stationary and/or mobile users such as personal computers, each equipped with a (Remote Unit) transceiver, are organized and directed by a Master Unit transceiver. Master Unit and Remote Unit transceivers have identical circuitry. Using a first pseudorandom code sequence (M-code), the Master Unit intermittently transmits a DSSS signal enabling Remote Units to synchronize to the Master Unit and so receive scheduling directives. A Remote Unit, while maintaining synchronization with the Master Unit, sends information by transmitting a DSSS signal using a second pseudorandom code sequence (R-code). To facilitate synchronization, the Master Unit also transmits a continuously running DSSS signal using a third pseudorandom code sequence (P-code) which is code-locked and phase-locked to the M-code. A transceiver implementing the protocol in the 2400–2483.5 MHz band includes a microprocessor, external data RAM, Control Logic Section, Analog Section, and Radiofrequency Section.

39 Claims, 15 Drawing Sheets

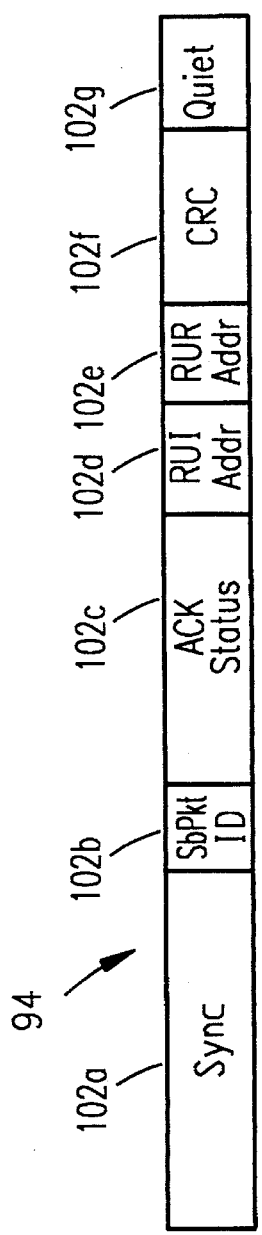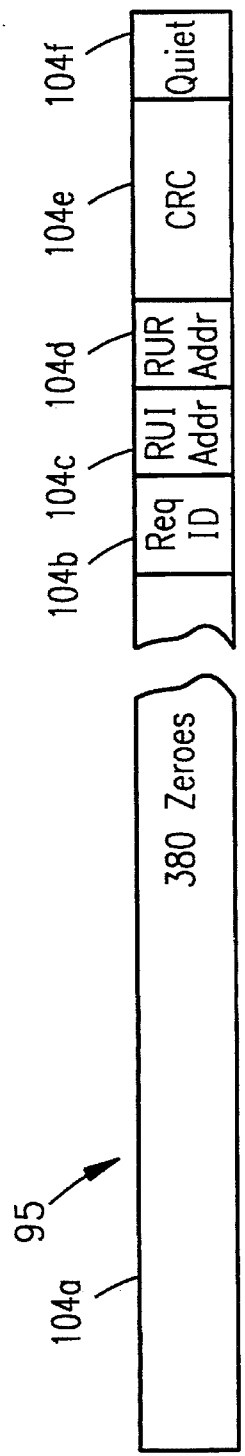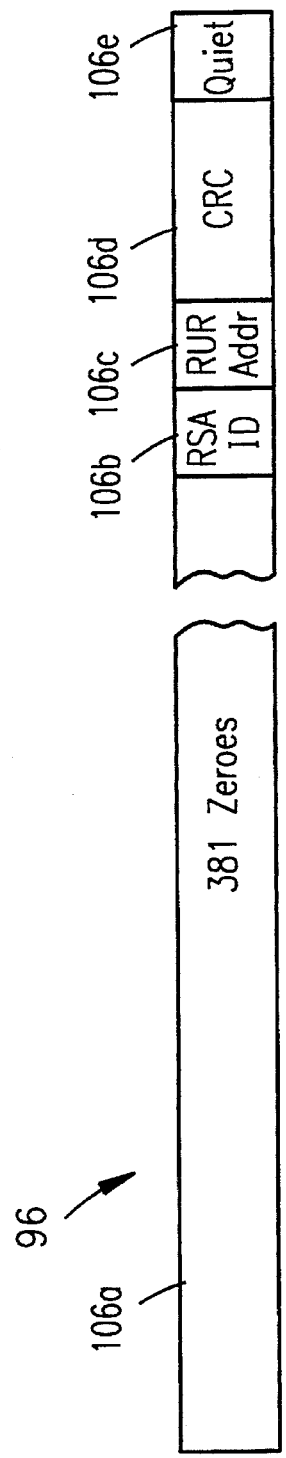

WIRELESS DIRECT-SEQUENCE SPREAD SPECTRUM TDMA COMMUNICATIONS SYSTEM

BACKGROUND OF THE INVENTION

1. Field Of The Invention

The present invention relates to wireless spread spectrum time-division multiple access (TDMA) communications systems and, more particularly, to wireless digital communications between pairs of Remote Units (RU) among a plurality of RU's organized into a communications network by a Master Unit (MU) which authorizes, schedules and controls all network transmissions. The invention is directed to a protocol method and a transceiver apparatus implementing and utilizing the protocol, common to each RU and the MU, which enable any network RU, when authorized by the MU, to transmit digital information at a rate of the order of one to several megabits per second (Mbps) directly to any other network RU or to the MU. Applications include a wireless local area network (LAN) comprised of personal computers (PC) exchanging files and sharing peripheral equipment such as printers and FAX machines, a network comprised of notebook and palmtop computers some or all of which may be in relative motion, a vehicle location system wherein a fixed station continuously tracks the locations of moving vehicles in its vicinity, wireless private branch exchange (PBX) telephone networks, and two-way telemetry among specialized computers such as patient monitors and artificial intelligence diagnostic devices.

The Federal Communications Commission (FCC) has recognized the need for low powered wireless transmission systems that do not require user licensing. Three frequency bands have been allocated for transmissions utilizing direct-sequence spread spectrum (DSSS), frequency hopping (FH), and hybrid DSSS/FH modulation formats. Specifically, these frequency bands are 902–928 MHz, 2400–2483.5 MHz, and 5725–5850 MHz. The 902–928 MHz band is relatively narrow and crowded with such devices as cordless telephones, store security systems and paging systems. The other two bands offer sufficient bandwidth to transmit information at megabit data rates and presently are more free of interference from other types of devices than is the 902–928 MHz band.

The term "spread spectrum" is defined as any of a group of modulation formats in which a radio frequency (RF) bandwidth much greater than necessary is used to transmit an information signal so that a signal-to-interference improvement may be gained. The energy contained in a base-band signal is spread over a broad-band in a pseudo-random manner during transmission and the narrow-band signal is retrieved during reception. The term "direct-sequence" is defined as a form of spread spectrum modulation wherein a code sequence is used to directly modulate a carrier. In DSSS communications, a transmitter modulates the carrier with a pseudo-random digital sequence (PRDS) from a pseudo-random code generator (PRCG) whose "chip" rate is much higher than the symbol rate of the information signal transmitted. Each symbol of the information signal is individually encoded by multiple chips, typically 32 to 512 chips per symbol. A receiver demodulates the carrier so as to decode the information signal by adjusting the phase of a PRDS code, generated by a local PRCG and identical to the transmitted PRDS code, to correlate (or "synchronize") with the transmitted PRDS code. For proper despreading of the digital information to occur, the locally generated PRDS code must exactly align with the transmitted PRDS code, in particular by taking into account the shift in phase due to delay of reception resulting from the finite speed of electromagnetic wave propagation.

TDMA takes advantage of a transmission medium which can support a higher data rate than is required to satisfy individual network users. Essentially, multiple digital communications signals are interleaved temporally over a single broadcast transmission within the network, although a specific "virtual link" is created during each separate transmission from a Remote Unit Initiator (RUI) to one or more Remote Unit Recipients (RUR).

As is well known in the art, PRDS's with excellent auto-correlation and cross-correlation properties can be conveniently generated by combining two so-called maximal linear code sequences, each generated by a binary linear feedback shift register. Maximal codes have the following properties: (a) the maximum length sequence is $2^n-1$ bits, where n is the number of stages in the shift register; (b) the number of ones is one more than the number of zeroes; (c) the statistical distribution of ones and zeroes is well defined; (d) maximal codes have excellent autocorrelation properties; (e) a modulo-2 addition of a maximal code with a phase-shifted copy of itself generates another copy of itself having a different phase shift; and (f) except for the all-zeroes condition, every possible "n-tuple" state of the n-bit shift register exists once and only once during the code sequence. In particular, PRDS's termed "Gold-codes" are generated by modulo-2 addition of an appropriate pair of maximal linear sequences ("base codes"). Such PRDS's are the same length as the two base codes, but are non-maximal. Each change in register relative position between the two base code generators creates a new PRDS, so that $2^n-1$ Gold-code sequences, each $2^n-1$ bits in length, can be generated from a pair of n-register generators.

Although PRDS codes and specifically Gold-codes are commonly used in DSSS communication systems, difficulties heretofore inherent in rapidly synchronizing two long code sequences have tended to constrain designers to use short sequences, typically of the order of tens to hundreds of chips, particularly in applications utilizing low-cost, low-power hardware rather than high precision master and chip clocks and acquisition, tracking and correlation-testing circuitry. Use of a short PRDS code is not a disadvantage for an application which does not require significant process gain. For example, a short code may suffice for a short-range communication system operating in a general area where no other spread spectrum communications systems are operating. However, should there be multiple PRDS codes concurrently transmitted by neighboring systems, use of a long code is essential both to achieve process gain which can overcome noise interference caused by the other systems, and to reduce the probability of a "collision", i.e., choosing a code already in use, such probability increasing as the number of competing systems increases and their code sequence lengths decrease. For example, if there are ten coexisting networks, each using a 255-chip PRDS so there are 255 possible code sequences, and all are transmitting at a given time, there is a 0.15 probability that a particular network, having randomly selected a code, will collide with at least one other network. If there are forty such networks, the probability of collision remains close to unity, even after selecting another code in the first instance of a collision.

The interrelated problems of rapid PRDS synchronization and collision avoidance become particularly severe for a wireless DSSS network having a large number of RU's and operating TDMA. During any given time period, multiple RU's generally will be wanting to transmit. These are likely to be a random subset of the RU's in the network, each perhaps with a different length message and different intended recipient(s). For example, some RU's may want to transmit short "bursty" messages while others want to transmit long messages. To increase the percentage of time when information is being transmitted over the network, it is necessary to reduce the percentage of time needed to perform "overhead" functions such as designating and switching among RUI's, alerting RU's that an attempt will be made to send them a message, i.e., informing them they have been designated as RUR's, and attempting and testing for PRDS correlation between Remote Units. But using short PRDS codes to simplify correlation in the hope of reducing overhead time risks increasing overhead time because of increased susceptibility to collisions due to identical PRDS codes being used by neighboring "sibling" networks.

For DSSS TDMA networks which use a "contention"-type protocol rather than a time division ("slotted") protocol, collisions can occur not only because of interference from sibling networks, but also because RUI's within a network are contending for transmission access time. Traditional slotted systems, even when dynamic allocation is employed, suffer from inefficiencies encountered from trying to accommodate both bursty and high duty cycle RUI's. This type of collision problem becomes increasingly severe as the number of RU's in a network increases, the percentage of RU's wanting to transmit within the same time frame increases, and the average message length increases.

2. Description Of The Related Art

The problem of increasing data transmission time in a wireless DSSS TDMA network having a large number of users by reducing PRDS synchronization time has been addressed in the art. U.S. Pat. No. 5,206,881 ("'881") to S. Messenger et al. is directed to a method and apparatus for synchronizing an MU serving as a communications controller regulating data transfer throughout an LAN, with RU's which sequentially transmit messages to the MU after being polled by the MU.

The method involves transmitting from a "source" station, typically but not necessarily the MU, a synchronizing packet which is DSSS-encoded with a PRDS code and adjusting the phase of the PRDS code of each of the other stations to a phase value which synchronizes that station's PRDS code with the synchronizing packet. Transmission of the synchronizing packet and initial phase adjusting of the various RU's occur before data packets are transmitted. The synchronizing packet has a phase corresponding to that of the source station PRDS code at the time of its transmission. When the PRDS codes of the other stations are adjusted to synchronize to the packet, their phases then correspond to the current phase of the source station, delayed by an amount corresponding primarily to packet transit time. Each RU performs a wide-range search for a phase value synchronizing its PRDS code with the synchronization packet by repeatedly selecting different phase values over a range of phases corresponding to the maximum possible phase difference between itself and the source station, producing phase-shifted PRDS codes, combining the phase-shifted PRDS codes with the synchronizing packet to produce test signals, and detecting the synchronizing phase value by comparing the test signals. Once the synchronizing phase has been found, the RU switches to a narrow-range search for phase values synchronizing its PRDS code with each succeeding data packet.

More generally, the method involves switching from the wide-range search mode to the narrow-range search mode in response to detection of a phase value synchronizing the PRDS code of the RU with a received data packet, and switching from the narrow-range mode to the wide-range mode whenever a predetermined period of time has expired from detection of a synchronizing phase value.

U.S. Pat. No. 5,276,703 ("'703") to D. Budin et al. also addresses the problem of increasing data transmission time in a wireless DSSS TDMA network having a large number of users. The '703 patent is directed to a method and apparatus for reducing contention-type collisions in an LAN, and also mitigating multipath effects due to reflections of radio waves from local objects. An MU is in radio communication with a plurality of RU's via a down-link channel operating at a frequency of 5780 MHz. All transmissions from the RU's to the MU are via an up-link channel operating at 2440 MHz. The MU controls all communications occurring over the wireless network and also serves as agent for all network management functions such as collecting performance and error statistics. Communications between RU's can occur only when an RU first transmits a message to the MU via the up-link channel, the MU immediately rebroadcasting the message via the down-link channel.

The method includes a communications protocol combining a common slotted time frame with TDMA dynamic slot allocation. Information is transmitted over the network as discrete packets. During a period when the MU is imposing a common slotted time frame, RU's requiring use of the up-link channel utilize assigned time slots to send short Transmit Request Codes (TRC) to the MU. Thereafter, the MU may dynamically change the number of packets that a particular RU may transmit pursuant to a single transmission request. The MU may also assign more than one time slot to a particular RU, so that high priority users are serviced more often. Once granted access to the up-link channel, an RU has sole control until completing its transmission. Access time can be regulated by limiting the number and size of data packets that an RU is allowed to transmit after any single transmission request is granted.

Collisions could occur when one RU is transmitting and another RU wishes to request access to the up-link channel. The requesting RU must not only synchronize itself to a preassigned time slot, but must also ensure that the MU has not allocated sole control of the channel to another RU. To ensure the channel has not previously been allocated, the MU imposes a "listen before talk" protocol. Thus, prior to broadcasting a request, an RU monitors the down-link channel to determine that no other RU is in the midst of transmitting.

Collisions could also occur as a result of the round trip communications delay between the MU and RU's. So the MU also imposes a "listen while talk" collision detection approach. Each RU monitors the down-link channel during transmission to ensure that its message was correctly received by the MU. If the transmitting RU determines that its signal is not being correctly received by the MU, it terminates transmission, relinquishes control of the up-link channel, and waits for its assigned time slot to occur so it can once again request control of the up-link channel.

U.S. Pat. No. 5,177,765 ("'765") to B. M. Holland et al. is directed to a method and apparatus for rapidly acquiring a DSSS TDMA or time division duplex (TDD) signal using small, inexpensive circuitry such as is located in portable telephones, and then successfully tracking the incoming spread signal in order to continually despread the digital information. The signal consists of a plurality of frames wherein each frame has a predetermined number of time slots. One time slot is spread with a PRDS code and carries acquisition and synchronization information. The other time slots are spread with other PRDS codes and contain communication data including header bytes used for tracking the acquired signal.

The method involves utilizing a PRCG whose random sequence output can be moved in time to match the random sequence in the received spread signal. During acquisition, the signal strength in each successive time slot for each frame is measured for a given number of time frames. The received signal is acquired by adjusting the PRCG so that the incoming signal strength is sampled at a point in time when the transmitted signal is present. The PRCG is then adjusted to the point in the sequence that corresponds with the maximum signal strength. A major acquisition sweep approximately locates the peak within a frame; then a refinement sweep precisely locates the peak and identifies the frame and time slot boundaries.

Tracking is similar to the acquisition process. After acquisition is completed, tracking occurs during the header bytes found at the beginning of each successive time slot. Thus, tracking is completed before the data portion within a time slot is received. The amount that the PRCG is to be adjusted is small when tracking because it must adjust only for the amount of drift between the transmitter clock and receiver clock that has occurred since the prior frame.

Rather than using a conventional PRDS having $2^n-1$ chips, the '765 invention adds an extra chip so that the ratio of the length, M, of the PRDS to the number of chips per digital bit of information, CB, is an integer. Since a PRDS occurs a fixed number of times within a time slot, $B_{ts}$ * M/CB is also an integer, where $B_{ts}$ is a predetermined number of digital bits per time slot. All PRDS codes are M chips in length and have the same CB value. This digital timing technique enables digital bit boundaries to be aligned on CB boundaries. That is, one digital bit of information is precisely aligned, in time, to a predetermined number of PRDS chips.

None of the above-cited references is directed to solving the problem of how RU's within a network can communicate directly with one another while adhering to the constraints imposed by the FCC on unlicensed users of the 902–928 MHz, 2400–2483.5 MHz and 5725–5850 MHz frequency bands, and while restricting all transmissions to a common one of these bands. If RU's within a DSSS TDMA network can bypass an intermediary node such as an MU when sending messages to other RU's, so that a message need not, in effect, be transmitted twice, network throughput can be doubled.

Nor do these references address the problems of achieving process gain to overcome interference from neighboring spread spectrum systems and avoiding collisions with neighboring sibling networks. Solution of these problems requires using long PRDS codes while being able to perform timely switching among RU's and rapid synchronization, acquisition and tracking for each successive virtual link in a TDMA network. The '881, '703 and '765 inventions use PRDS's which are 127, 48 and 128 chips long, respectively.

In view of the limitations of the above-cited methods and associated devices, there has been a need for a protocol method and a device implementing the protocol whereby a large number of unlicensed user RU's, typically several hundred, can be organized into a half-duplex TDMA wireless network wherein any RU can transmit information at a rate of the order of one to several Mbps directly to any other RU or to the MU over one of the three FCC-mandated spread spectrum bands. There further has been a need for a protocol and implementing device whereby a plurality of such networks within a general area densely populated with wireless LAN's such as a large office building complex can coexist without mutual interference.

OBJECTS OF THE INVENTION

Accordingly, it is a primary object of the present invention to provide a protocol and a radio transceiver device operating according to the protocol, which enables organizing a multiplicity of transceiver-equipped, non-licensed users into a DSSS TDMA network operating in one of the three FCC-mandated frequency bands, or in other frequency bands as they become available.

Another object of the invention is to provide a protocol and device enabling network users to exchange digital information at a rate commensurate with transferring data files between personal computers and between PC's and peripheral devices such as servers and printers.

A further object of the invention is to enable a plurality of networks each using a common protocol and transceiver design to operate without mutual interference in the same general area.

Yet another object of the invention is to provide a common design for all transceivers in a network, including a transceiver which authorizes, schedules and controls network transmissions.

A further object of the invention is to provide a protocol and device enabling rapid correlation of PRDS codes between a transmitting device and a receiving device immediately after the receiving device switches from a dormant to an active state.

Another object of the invention is to provide a transceiver device which is easily connected and disconnected to user equipment such as a PC or printer, which automatically configures itself in combination with other such transceivers into a DSSS TDMA network, and which is reliable in operation.

One more object of the invention is to provide a transceiver device that is inexpensive to manufacture.

Other objects of the invention will become evident when the following description is considered with the accompanying drawings.

SUMMARY OF THE INVENTION

The above and other objects are met by the present invention, a protocol and a wireless transceiver implementing and utilizing the protocol for direct DSSS TDMA digital communication between pairs of RU's among a plurality of RU's comprising a network, or between an RU and the network MU.

The protocol, referred to herein as the "RadioNet" protocol, determines a transaction cycle which begins with the MU broadcasting to all RU's that the network is presently available so that requests to become an RUI are being entertained, and ends when all data have been sent by an RUI and an RUR has acknowledged receipt. Each transaction cycle consists of a sequence of transactions, each transaction being selected from a set of five transaction types and determined by the protocol according to the transactions that have already occurred in that cycle, the separations and relative motions among the RUI, RUR and MU, and the time elapsed since the last communication between the RUI and RUR and/or the RUI or RUR and the MU. Each transaction type consists of a predetermined sequence of subpackets, each subpacket being one of a set of six subpacket types. Thus, all transactions of a given type have the same subpacket structure. Each subpacket type consists of a predetermined sequence of elements, each element being characterized by a specific number of bytes. Thus, each subpacket type comprises a predetermined total number of bytes where the ordinal position of each byte predetermines its representation of a specific element or portion thereof.

The protocol operates with a continually running first PRDS code ("M"-code) preselected from among 32,767 Gold-code sequences that can be generated from a first PRCG within the MU (and common to all RU's) having a pair of 15-bit linear feedback shift registers (LFSR's). The M-code is the "heartbeat" of the RadioNet protocol, and continues without interruption or syncopation whether or not the MU is transmitting.

All transactions begin with a Transaction Header (THD) subpacket, 13 bytes long, transmitted by the MU using the M-code. The THD is the only subpacket transmitted by the MU (although an MU can simultaneously assume the role of an RU and transmit subpackets in that role), so that over a transaction cycle typically comprising several thousand bytes and lasting less than 20 msec, the MU transmits using the M-code only a few percent of the time, typically less than 0.5 msec. The M-code sequence length is 32,768 chips. An extra chip is added to the 32,767 chip code sequence so that with 32 chips per bit and 8 bits per byte, each THD extends over 3328 contiguous chips, of which the first chip is the leading edge of a first synchronization byte and the last chip is the trailing edge of a "quiet" byte when the MU transmitter is off. A THD initiating a transaction cycle is received by all network RU's. Once the MU has designated a particular RU to be an RUI and informed another RU that it is to become an RUR, all other network RU's continue to listen for THD's even though they will not be participants in the present transaction cycle.

The M-code is generated at a chip clock frequency which results in the code being spread over a bandwidth the order of but less than the bandwidth of one of the three FCC-mandated bands. In a preferred embodiment for communications in the 2400–2483.5 MHz band, the chip clock frequency is 38 MHz resulting in an unfiltered 76 MHz spread spectrum bandwidth, a Main signal (Mainsig) unspread quadriphase carrier modulated by the M-code is at 2442 MHz, and the filtered (pass-band) spread spectrum bandwidth is 72 MHz. Due to the finite propagation speed of electromagnetic radiation, the 38 MHz chip clock frequency results in a corresponding chip distance of 7.895 m (25.9 ft). That is, a phase uncertainty of one chip is equivalent to an uncertainty in distance of 7.895 meters between the MU and an RU so that the RU must search over multiple successive chips to find the phase that synchronizes its locally generated PRDS with the M-code.

All transaction packets other than THD's are transmitted by network RU's using a common second PRDS code ("R"-code) preselected from among 32,767 Gold-code sequences that can be generated from a second PRCG within each RU identical to the first PRCG. As for the M-code, an extra chip is added to the R-code sequence so that its code sequence length is 32,768 chips. Similar to the THD transmitted by the MU, each subpacket transmitted by an RUI or an RUR extends over a predetermined number of contiguous chips, of which the first chip is the leading edge of either a first synchronization byte or a byte consisting of all zeroes, and the last chip is the trailing edge of a quiet byte.

The R-code is generated at the same chip clock frequency as the M-code, and RU's transmit using the same Mainsig parameters as for the Mainsig transmitted by the MU. Thus, in the preferred embodiment, the Mainsig unspread biphase carrier modulated by the R-code is at 2442 MHz and the passband bandwidth is 72 MHz.

An RU cannot communicate with another RU unless both RU's are synchronized to the MU. Such initial synchronization is referred to herein as "start-up" operation. Once an RU is synchronized to the MU, the process of tracking M-code data and transmitting or receiving R-code data is referred to herein as "normal" operation.

The MU transmits a third continuously running PRDS code ("P"-code) preselected from among 1,023 Gold-code sequences that can be generated from a third PRCG having a pair of 10-bit LFSR's. An extra chip is added to the chip code sequence so that the P-code sequence length is 1024 chips, i.e., one thirty-second of the M-code length. The P-code is code-locked to the M-code. That is, each P-code chip has a predetermined one-to-one correspondence with a particular M-code chip, so that successive P-code chips correspond to predetermined M-code chips which are 32 chips apart. The P-code is also phase-locked to the M-code. That is, the "all-one's" (ALLIS) position of the P-code exactly aligns with that of the M-code, and both code sequences have the same epoch. (The epoch of a PRDS code is defined herein as the time interval during which one complete sequence of the code is generated.)

The P-code is generated at a chip clock frequency which is one thirty-second of the M-code chip clock frequency. The bandwidth of an unfiltered spread spectrum "pilot" signal ("spilot") thus generated is one thirty-second the bandwidth of the unfiltered spread spectrum Main signal. In the preferred embodiment, two spilot signals are continuously transmitted to mitigate fading effects. The P-code chip clock frequency is 1.188 MHz resulting in an unfiltered 2.375 MHz spread spectrum bandwidth. A first ("low") spilot unspread carrier is at 2404.000 MHz and a second ("high") spilot unspread carrier is at 2480.000 MHz, i.e., near the lower and upper ends of the 2400–2483.5 MHz band.

The spilot signals facilitate synchronization of RU's to the MU. Since the spilots run continuously, an RU can always listen on one or the other spilot channels for the P-code. Since there are 1024 possible code positions and testing each position takes typically about 1.0 msec, the maximum P-code search time is about one second. Once an RU has locked onto the P-code, it holds that phase and frequency and begins searching for the M-code. Because of the one-to-one correspondence between P-code and M-code chips, a maximum of 32 phases must be searched, though generally less, depending upon phase-lock accuracy during the P-code tracking. Once an RU synchronizes to the M-code, it continues to lock onto and monitor the M-code. The RU then monitors received data until it synchronizes itself to a transaction structure.

A transceiver unit implementing the RadioNet protocol is referred to herein as a "RadioConnect Communication Engine" ("RCCE"). An RCCE includes appropriate hardware and firmware so that it can be configured, merely by setting switches, either as an MU or an RU. RCCE's can be packaged as stand-alone "black boxes" such as a parallel-port plug-in box external to a PC to which it connects, as circuit boards within PC's, or as special function products. An RCCE is comprised of a microprocessor, an external Data Random Access Memory (RAM), three external busses, a Control Logic Section, an Analog Section, and a Radiofrequency Section. An RCCE connects to a PC or other user device through a user-provided interface. Communications and data management functions relating a particular application's communication needs to RCCE data and timing formats are implemented by the user.

The microprocessor is an 8-bit general purpose microcontroller integrated circuit (IC) chip which provides all functions not directly part of user communication data. These functions include: code selection; code environment testing control; MU/RU selection and set-up; setting sensing states of light emitting diode (LED) indicators and switches; setting and controlling power levels; fine-tuning clock drift; monitoring diagnostic information; monitoring user mode, link control, and higher protocol interface(s); setting priorities and allocating data bandwidth; monitoring logical names and addresses of users and nodes; and loading parameters and constants into the Control Logic Section and Radiofrequency Section.

The microprocessor has an external RAM addressing capability, and includes read-only memory (ROM) for program execution, a limited amount of RAM for register-type data storage, a limited amount of electrically erasable programmable ROM (EEPROM) for non-volatile parameter storage, a multiplexed high-speed 8-bit analog-to-digital (A/D) conversion capability for processing filtered analog signals to digital values, a plurality of pulse-width modulation (PWM) outputs providing analog levels to set signal thresholds or power levels, and a plurality of input/output (I/O) pins for discrete digital input/output and control.

The external Data RAM provides buffer storage for digital data messages which a user is sending or receiving. The RAM also provides temporary storage for settings, message and communication virtual circuit reservations, priority information, code restart locations, chip offsets, and chip distance information. The RAM is a 32K×8 bit complementary metal-oxide semiconductor (CMOS) chip which is accessed by the microprocessor to transfer in or read out data via two buffer registers in the Control Logic Section which also controls RAM address, read/write, data management and timing control functions.

An external memory 16-bit address bus, an external memory 8-bit data bus, and an external memory control bus enable the microprocessor to communicate with the other RCCE hardware elements.

The Control Logic Section includes: a microprocessor interface; a user interface; a PLL logic subsection; a communication data control logic subsection; an analog interface logic subsection; a Main signal code generator logic subsection; a spilot code generator logic subsystem; a code and search control logic subsection; a control logic timing subsection; and a clock drift control logic subsection. The Control Logic Section is implemented as a CMOS digital application-specific IC (ASIC) in a 10,000 gate array.

The microprocessor interface enables the microprocessor to transfer data and transfer information to and from the other RCCE elements. The user interface provides direct digital communication between the RCCE and user. The PLL logic subsection provides "divide-by" and "phase comparison" digital logic to the PLL subsection of the Analog Section. The communication data control logic subsection buffers two input lines and two output lines of serial quadrature-phase (quadriphase) shift keying (QPSK) coded data (wherein four states corresponding to two data bits are encoded into each "symbol") between the Radiofrequency Section and the Control Logic Section. The analog interface logic subsection buffers thresholded radiofrequency signal strength indication ("RSSI") signals from the Analog Section and provides access to communication data control and/or control logic timing signals. The Main signal code generator logic subsystem implements the M-code and R-Code. The spilot code generator logic subsystem implements the P-code. The code and search control logic subsection provides timing and control for maintaining, retarding or advancing the phase of modified Gold-code generators in the Main signal and spilot code generator logic subsystems, and initializes at appropriate times the PRDS codes generated during the RadioNet protocol. The control logic timing subsection establishes overall protocol timing and also provides timing control for the entire Control Logic Section. The clock drift control logic subsection, used only when an RCCE is an RU, measures the amount of correction required to maintain correlation while tracking the MU during normal protocol operation.

The Analog Section includes: a PLL subsection, a signal levels-to-digital signals converter subsection, a power control subsection, a voltage-controlled temperature-compensated crystal oscillator (VCTCXO), and a voltage-controlled oscillator (VCO). Analog Section circuitry includes discrete IC components including amplifiers, analog gates, comparators and hybrid circuit assemblies, and discrete resistors, capacitors and inductors.

The PLL subsection provides three highly stable digital clock frequencies, 14.4000 MHz, 7.200 MHz and 76.000 MHz. The 14.4000 MHz signal is the source of all RF frequencies in the Radiofrequency Section. The 7.200 MHz signal provides a reference frequency for the microprocessor. The 76.000 MHz signal is the source of a chip clock used throughout the Control Logic Section. The signal levels-to-digital signals converter subsection filters and compares RSSI analog signals received in the Radiofrequency Section and converts the RSSI signals into digital signals to test for correlation between a received PRDS code and a test PRDS code. The power control subsection filters a PWM signal generated by the microprocessor to produce a direct current (DC) analog power control signal which is provided to the Radiofrequency Section to set RF transmitter output power level output. The VCTCXO generates the 14.4000 MHz frequency used as the RCCE "master clock". The VCO generates the 76.000 MHz frequency used in the PLL subsection of the Analog Section.

The Radiofrequency Section includes: a Main signal ("Data") transmitter; a "Low Spilot" and a "High Spilot" transmitter, identical except for the center frequency of their spread spectrum signal and center frequency of an output band-pass filter (BPF); "Early", "Punctual" and "Late" RF receivers having identical circuitry; a frequency generator; a control interface; six input/output selector switches; an antenna coupler; and an antenna. Radiofrequency Section circuitry is implemented in discrete, IC and hybrid circuit elements.

The Data transmitter provides a QPSK-modulated spread spectrum RF signal centered at 2,442.000 MHz. The Low Spilot and High Spilot transmitters each provide a QPSK-modulated spread spectrum signal centered at 2,404.000 and 2,480.000 MHz, respectively. The Punctual receiver is used for correlation testing during searches and for data reception during communication. The Early and Late RF receivers are used for tracking during communication to maintain optimum correlation by testing for correlation each PRDS code phase tested by the Punctual RF receiver, one-quarter clock-chip earlier and one-quarter clock-chip late, respectively, concurrent with and relative to the Punctual receiver. The frequency generator generates the many frequencies required by the Radiofrequency Section. The control interface provides registers for local control of the Radiofrequency Section via the microprocessor. Whenever the Data transmitter is operating, the three RF receivers are disabled, their inputs switched off via a first three selector switches to prevent overloading. Whenever the RF receivers in the MU are enabled, the Data transmitter is disabled. Its output is switched off via a selector switch to prevent overloading of the receivers' inputs. In RCCE's operating as RU's, the Low Spilot and High Spilot transmitters are always disabled by the corresponding selector switches, and the Data transmitter is disabled by the corresponding selector switch whenever the RF receivers are enabled. Each of the first three selector switches enables switching different signals into and out of the antenna coupler. The antenna coupler includes passive elements providing isolation among the six selector switches while connecting each transmitter and receiver to the antenna via a low loss path.

A more complete understanding of the present invention and other objects, aspects and advantages thereof will be gained from a consideration of the following description of the preferred embodiment read in conjunction with the accompanying drawings provided herein.

BRIEF DESCRIPTION OF THE DRAWINGS

FIG. 7A depicts the communication format utilized by a transaction header (THD) subpacket of the invention protocol.

FIG. 7B depicts the communication format utilized by a first type of long chip search initiator (LCSI) subpacket of the invention protocol.

FIG. 7C depicts the communication format utilized by a second type of long chip search recipient (LCSR) subpacket of the invention protocol.

DESCRIPTION OF THE PREFERRED EMBODIMENT

I. INTRODUCTION

Figure 1:
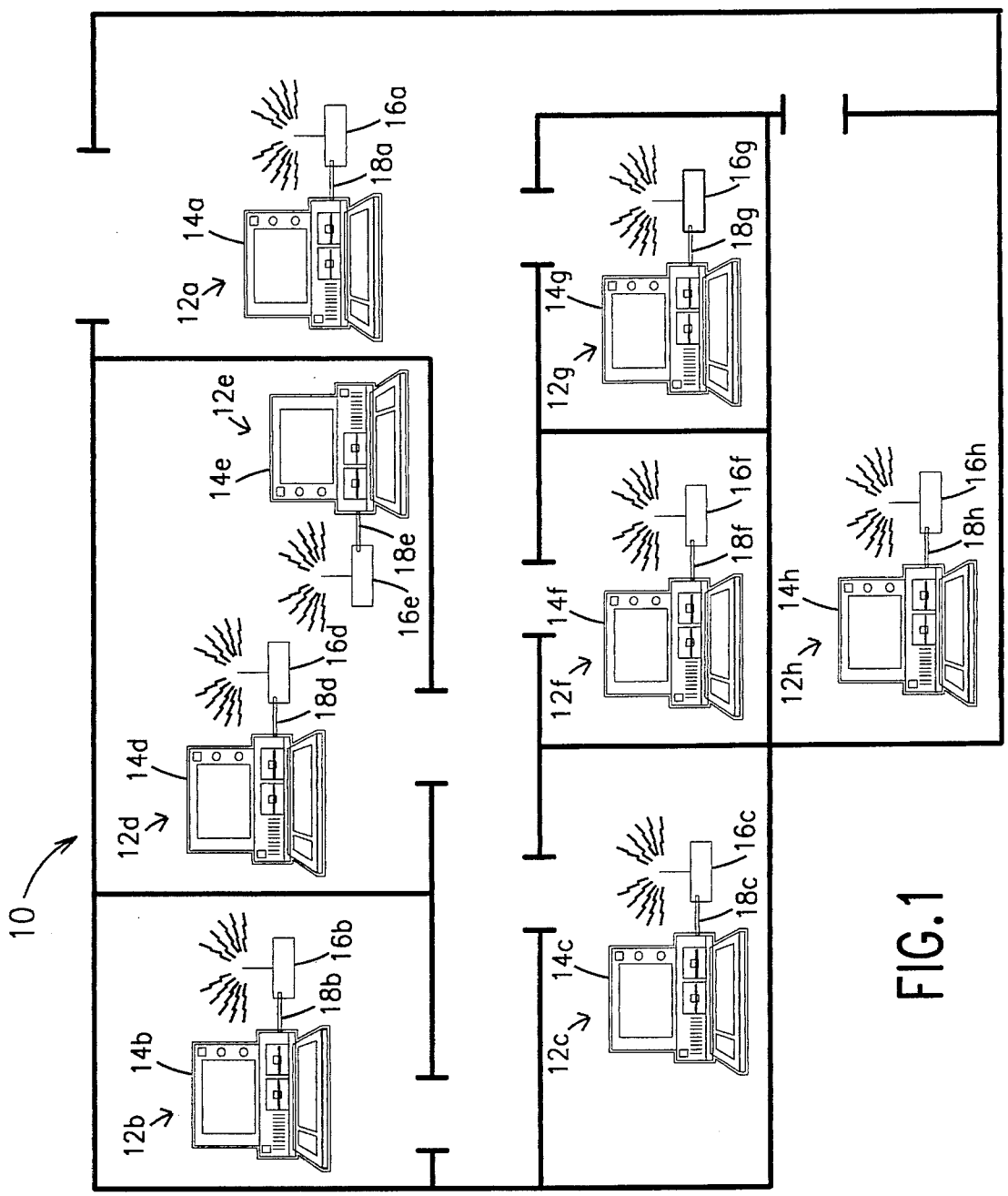
FIG. 1 depicts schematically a wireless DSSS TDMA local area network according to the present invention, including a Master Unit connected to a central computer, and a plurality of Remote Units, each connected to a personal computer.

While the present invention is open to various modifications and alternative constructions, the preferred embodiment shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims. More specifically, it is to be understood that the below-described protocol is applicable not only to wireless communication but also to communication among network transceivers connected by means of cables adapted for RF transmission, and that the below-described embodiment of a transceiver, including the operating frequencies and parameters given by way of example, is merely illustrative of one of the many specific embodiments which represent applications of the principles of the present invention. Clearly, numerous and other arrangements can be readily devised by those skilled in the art without departing from the scope of the invention.

1. Basic System Architecture

FIG. 1 shows an exemplary wireless DSSS TDMA communications network 10 according to the invention. The network 10 includes a central node 12a comprising a central computer 14a such as a server, a wireless transceiver 16a configured as an MU, and an interface 18a connecting the computer 14a and MU 16a. The network 10 further includes a plurality of remote user nodes 12b–12h each comprising, respectively, a PC 14b–14h, a wireless transceiver 16b–16h configured as an RU, and an interface 18b–18h. All transmissions from the MU 16a to any or all of the RU's 16b–16h, all transmissions from an RU designated by the MU as an RUI to an RU designated by the MU as an RUR, and all transmissions from an RU to the MU are over a common one of three frequency bands, viz., 902–928 MHz, 2400–2483.5 MHz, and 5725–5850 MHz. In a preferred embodiment, all transmissions are in the 2400–2483.5 MHz band, and a network can include up to 255 ground-based RU's, each of which is located within a circular coverage area of radius 375 m (1230 ft). The MU may be positioned anywhere in the coverage area. At any point in time, each RU may be either stationary or in relative motion with respect to the MU.

To simplify discussion, the following description is directed to exemplary network 10. It should be understood, however, that the description also encompasses any and all networks which include an MU 16a and a multiplicity of RU's 16b, 16c, 16d, . . . , up to a maximum of 255 RU's. In describing principles and features of design and operation which are common to all transceivers and/or other network node elements, a convention used herein is to denote a generic element by a reference number and a specific element of that genre by the same number to which a letter suffix has been added.

Figure 2:
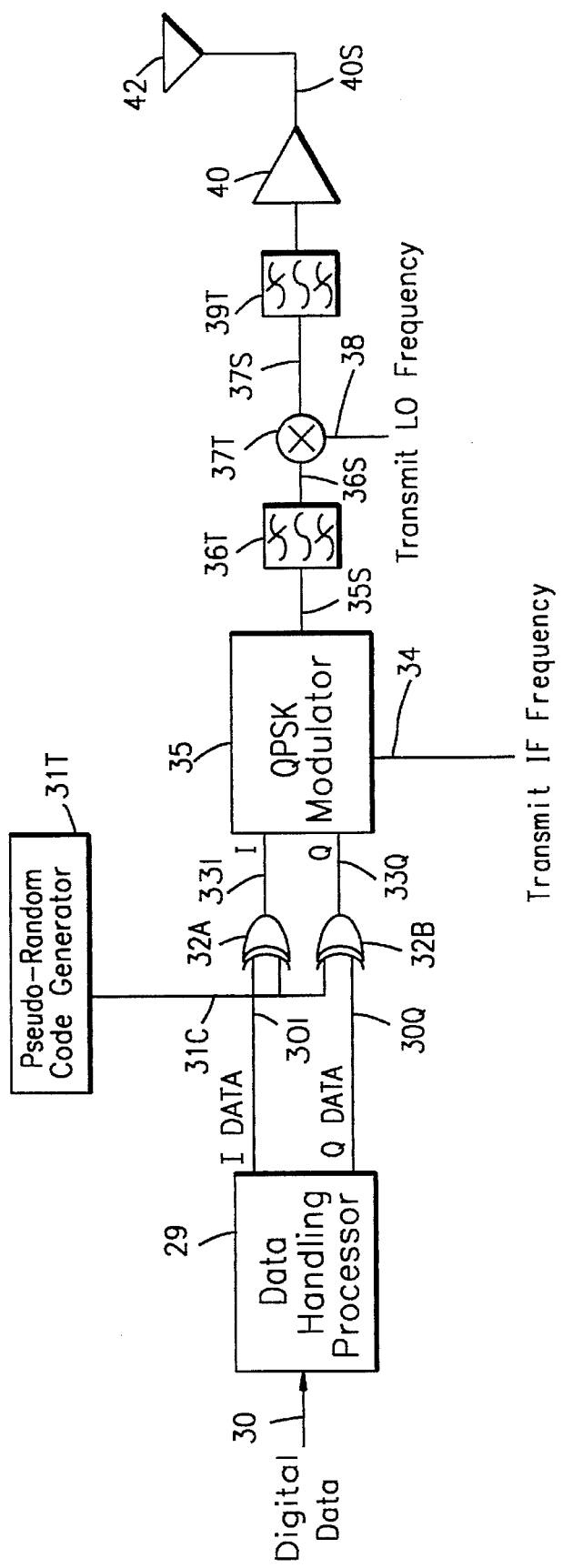
FIG. 2 depicts schematically sequential steps in modulating and transmitting a DSSS signal including: processing digital data into in-phase and quadrature data bit streams; multiplying the data streams by a PRDS generated by a first PRCG; modulating a transmit intermediate frequency with the data streams in a QPSK modulator; passing the resultant spread spectrum signal through a first band pass filter; heterodyne modulating the filtered signal; passing the heterodyned signal through a second band pass filter; and amplifying and transmitting the signal.

FIG. 2 shows schematically sequential steps performed by a transceiver 16 in modulating and transmitting a DSSS signal. As all transceivers in a network of the present invention have an identical design, the same sequence of steps entailing the same design parameters is used when transmitting whether a transceiver is configured as an MU or an RU. A data handling processor 29 outputs computer-generated digital data 30 to transceiver 16 via interface 18 (not shown). Processor 29 forms an in-phase data stream ("IDATA") 30I and a quadrature data stream ("QDATA") 30Q. A PRCG 31T generates a PRDS 31C which multiplies each of the data streams 30I and 30Q, by modulo-2 addition of the data stream and PRDS in, respectively, exclusive-OR gates 32A and 32B, to form, respectively, data streams 33I and 33Q. Data streams 33I and 33Q are input to a QPSK modulator 35 to modulate a transmit intermediate ("IF") frequency 34, creating a spread spectrum signal 35S centered at the transmit IF frequency. Signal 35S is filtered in a first band pass filter 36T to reduce the power in side bands of the spread spectrum signal, and the filtered signal 36S is modulated by a transmit local oscillator ("LO") frequency 38 in a modulator 37T to heterodyne into the desired transmit frequency band a spread spectrum signal 37S. Signal 37S is filtered in a second band pass filter 39T to meet transmit bandwidth and power regulations, and is amplified in an amplifier 40, and transmitted on an antenna In the preferred embodiment, the chipping rate of PRDS 31C is 38 MHz, and the data rate for data streams 30I and 30Q is 593.75 kHz. FIG. 3A shows relative amplitude vs. frequency of the data streams 33I and 33Q.

Figure 3B:
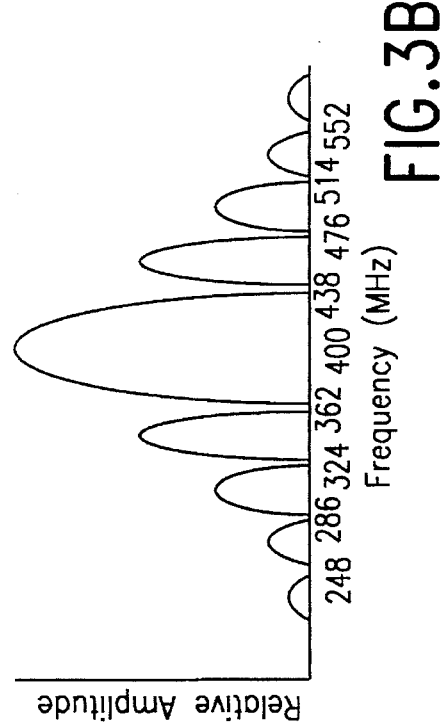
FIG. 3B shows the relative amplitude vs. frequency of the main-lobe and first three side-lobes of the FIG. 2 spread spectrum signal generated by the QPSK modulator when the PRCG operates at a 38 MHz chip-clock rate, and the IF frequency is 400 MHz.

FIG. 3B shows relative amplitude vs. frequency of the spread spectrum signal 35S generated by the QPSK modulator 35.

Figure 3D:
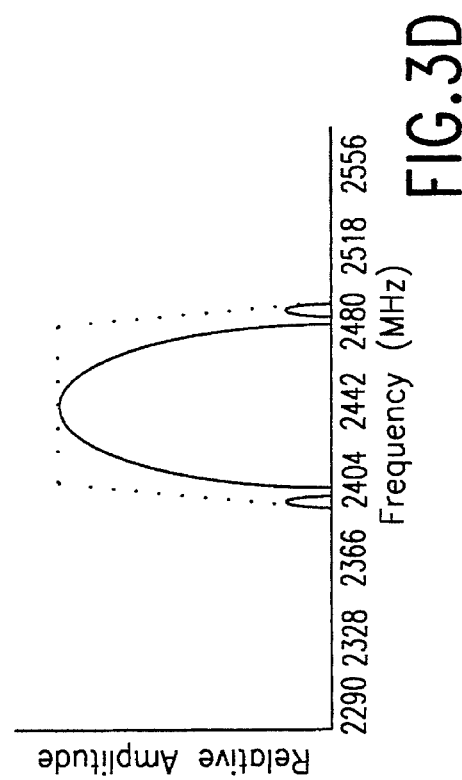
FIG. 3D shows the relative amplitude vs. frequency of the main-lobe and first side-lobes of the FIG. 3C signal after passing through the FIG. 2 second band pass filter, centered at 2442 MHz, and the amplifier.
Figure 3A:
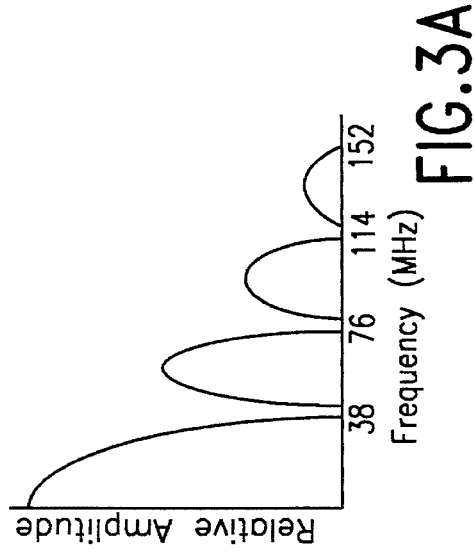
FIG. 3A shows the relative amplitude vs. frequency of the FIG. 2 in-phase and quadrature data streams after being multiplied by the PRDS.
Figure 3C:
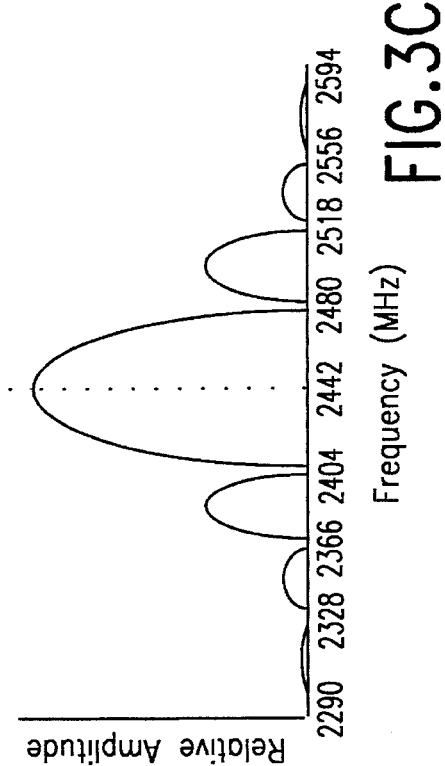
FIG. 3C shows the relative amplitude of the main-lobe and side-lobes vs. frequency of the FIG. 3B signal after filtering by the FIG. 2 first band pass filter centered at 2442 MHz.

In the preferred embodiment, the first band pass filter 36T is centered at 400 MHz and has a pass band width of 76 MHz. FIG. 3C shows relative amplitude vs. frequency of the filtered spread spectrum signal 36S.

In the preferred embodiment, the transmit LO frequency 38 is 2042 MHz, and the second band pass filter 39T is centered at 2442 MHz and has a pass band width of 76 MHz. FIG. 3D shows relative amplitude vs. frequency of the transmitted amplified spread spectrum signal 40S.

Figure 4:
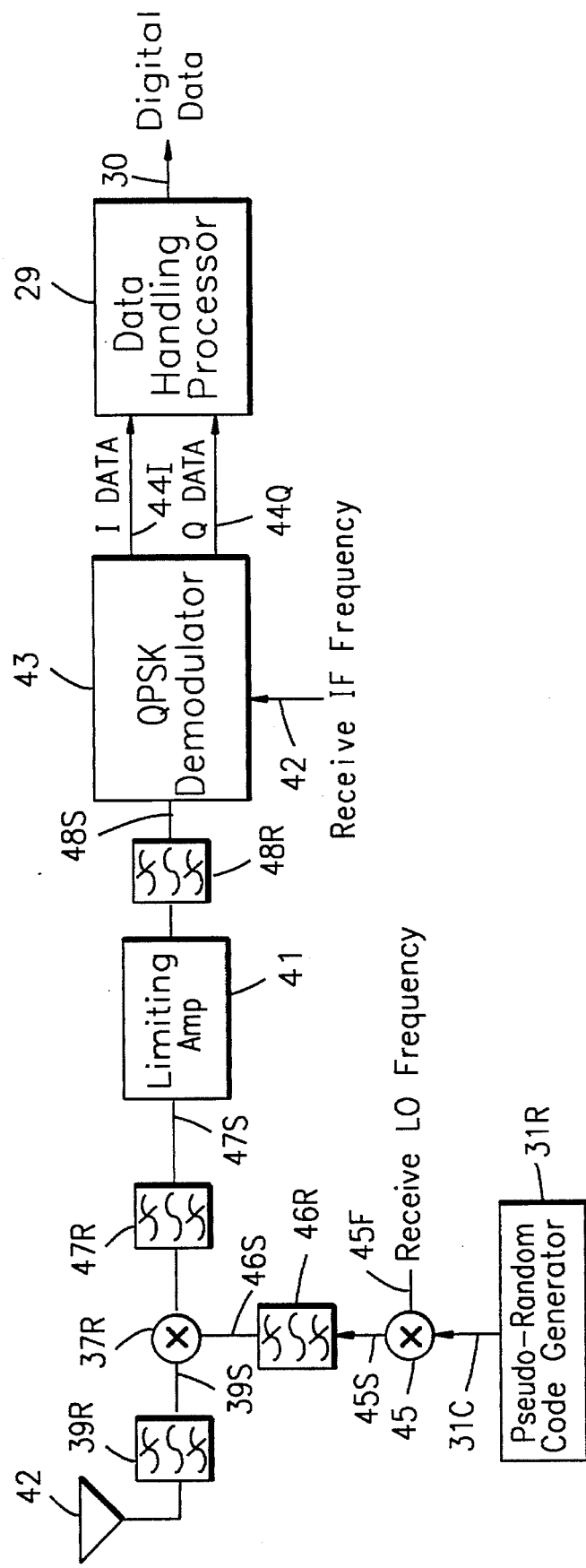
FIG. 4 depicts schematically sequential steps in receiving, despreading and demodulating the FIG. 2 transmitted DSSS signal including: receiving the signal; passing the signal through a first band pass filter; modulating in a first modulator a receive low frequency signal with the FIG. 2 PRDS generated by a second PRCG and filtering the resultant signal in a second band pass filter; mixing the PRDS-modulated signal with the received signal in a second modulator and filtering the resultant signal in a third band pass filter; passing the mixed signal through a limiting amplifier and a fourth band pass filter; and demodulating the resultant signal in a QPSK demodulator to generate in-phase and quadrature data bit streams.

FIG. 4 shows schematically sequential steps performed by the transceiver 16 in receiving, despreading and demodulating a DSSS signal. The same sequence of steps entailing the same design parameters is used when receiving whether a transceiver is configured as an MU or an RU. A transmitted spread spectrum signal is received at the antenna 42 and passed through a first band pass filter 39R to form a band-limited signal 39S. A receive LO frequency 45F is modulated in a first modulator 45 by the PRDS 31C generated by a PRCG 31R. The resulting signal 45S is filtered by a second band pass filter 46R, resulting in a spread spectrum signal 46S. The received and filtered signal 39S is mixed with signal 46S in a second modulator 37R, and the resulting signal filtered in a third band pass filter 47R to form a signal 47S which is then limited in a limiting amplifier 41 including a first IF channel 41A (not shown), filtered in a fourth band pass filter 48R, and input as IF signal 48S to a QPSK demodulator 43 having a reference receive IF frequency 42. QPSK demodulator 43 generates an in-phase data signal 44I and a quadrature signal 44Q from the incoming IF signal 48S. Signals 44I and 44Q are processed by the data handling processor 29 to form digital data which are input via interface 18 (not shown) to computer 14 (not shown).

Figure 5A:
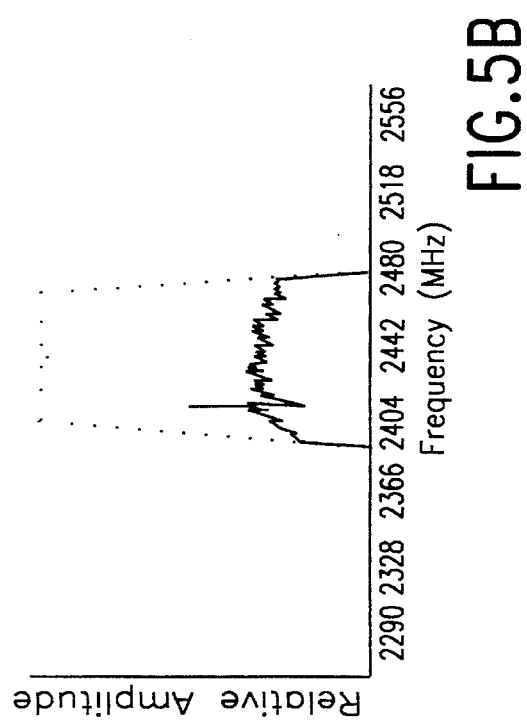
FIG. 5A shows the relative amplitude of the FIG. 4 received DSSS signal, with noise, as a function of frequency.

FIG. 5A shows the relative amplitude vs. frequency, with noise, of a spread spectrum signal received at the antenna 42.

Figure 5B:
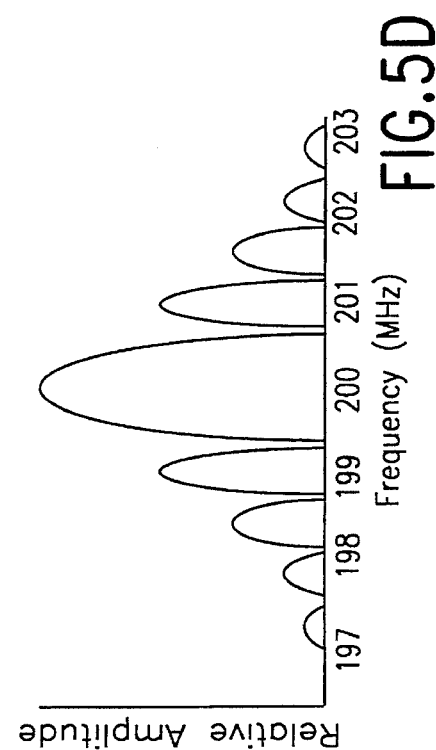
FIG. 5B shows the relative amplitude vs. frequency of the FIG. 5A signal after passing through the FIG. 4 first filter.

FIG. 5B shows the relative amplitude vs. frequency of the FIG. 5A signal after passing through filter 39R.

Figure 5C:
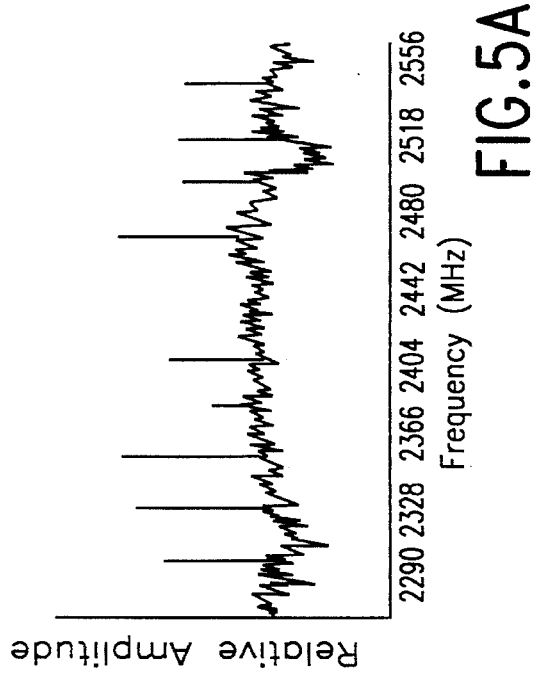
FIG. 5C shows the relative amplitude vs. frequency of the PRDS generated by the FIG. 4 PRCG.

FIG. 5C shows the relative amplitude vs. frequency of PRDS 31C generated by PRCG 31R.

Figure 5D:
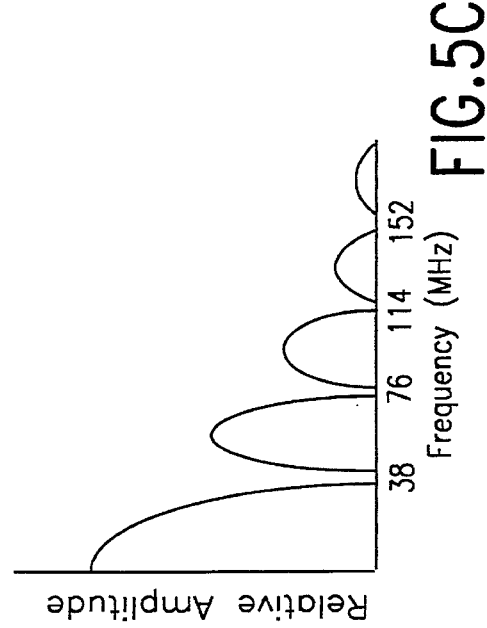
FIG. 5D shows the relative amplitude vs. frequency of the FIG. 4 despread signal after passing through the third band pass filter centered at 200 MHz.

In the preferred embodiment, the receive LO frequency 45F is 2242 MHz, band pass filter 47R is centered at 200 MHz and has a pass band width of 650 kHz, and the receive IF frequency is 200 MHz. FIG. 5D shows the relative amplitude vs. frequency of filtered signal 47S.

2. PRDS Codes

In the preferred embodiment, PRCG 31T is a modified Gold-code PRCG including first and second 15-bit LFSR's 50A, 51A which each generate a maximal PRDS 52A, 53A that is $2^{15}-1=32,767$ chips in length. PRDS's 52A, 53A can be modulo-2 added by PRCG 31T to generate any one of 32,767 Gold-code PRDS's, each 32,767 chips in length. When a transceiver 16a is configured as an MU, a first PRDS code (M-code) 31M preselected from among the 32,767 possible Gold-code sequences and generated by PRCG 31T is used to generate a continuously running network M-code. An extra chip is added to the M-code 31M so that the total number of chips is 32,768. PRCG 31R is a second modified Gold-code PRCG including first and second 15-bit LFSR's 50B, 51B and running at a different chip phase than PRCG 31T. PRCG 31R generates a second PRDS code (R-code) 31R used to test and track DSSS signals received from RU's. The R-code 31R is preselected from among 32,767 Gold-code sequences. An extra chip is added to the R-code 31R so that the total number of chips is 32,768. For a transceiver 16 configured as an RU, PRCG 31T is used alternately for M-code tracking and R-code transmitting, and PRCG 31R is used for testing transmissions of network RUI's to determine if the RU is an intended RUR.

Only the MU transmits the M-code, via a Main signal 55M. M-code transmission is brief and intermittent, typically totaling less than 5 percent of a transaction cycle. An M-code transmission is used only for one of the following purposes: to inform RU's that the network is presently available for communication; to inform an RU that its request to initiate a transmission has been granted, i.e., it has been designated by the MU as an RUI, and to inform another RU that it has been designated as an RUR; or to acknowledge information received by the MU.

Only RU's transmit the R-code, via a Main signal 55R. R-code transmissions are used for one of the following purposes: to request permission to become an RUI; to enable the MU to synchronize to an RU; to enable synchronization between an RUI and RUR; to transmit data from an RUI to an RUR; to acknowledge receipt of MU directives or RUI data; or to report self-status.

In the preferred embodiment, both the M-code 31M and R-code 31R are generated at a 38 MHz chip clock frequency, resulting, as shown in FIG. 3B, in a 76 MHz spread spectrum bandwidth. At 38 MHz, the epoch of each 32,768 chip sequence ("code length") is 862.3 μsec. As 64 chips are allocated to each symbol, the baud rate is 593.75 kilobaud. As 2 bits of information are carried by each symbol, the bit rate is 1.188 Mbps and the data bit time is 0.842 μsec. As 8 data bits are allocated per byte, the data byte time is 6.737 μsec and there are 128 data bytes per code length.

It will be apparent to those skilled in the art that regardless of the choice of chip clock frequency, the PRDS code length, number of chips allocated per symbol, and number of data bits allocated per byte may be selected arbitrarily provided that the code length is the product of two integers, and the number of chips encoding a digital bit and the number of bits included in a digital byte are also integers.

Referring to FIGS. 2 and 3A, both the M-code 31M and R-code 31R are mixed with in-phase and quadrature data bit streams 30I, 30Q, and modulate the narrow-band transmit IF frequency 34. In the preferred embodiment, data which modulate the M-code 31M or R-code 31R are transmitted as symbols, clocked at a 593.75 MHz rate. The data are spread to a 76 MHz bandwidth by the 38 MHz chip clock.

Referring to FIGS. 4 and 5D, the spread spectrum transmitted signal is received through the IF filter 47R with limited bandwidth before going to the QPSK demodulator 43. In the preferred embodiment, the bandwidth of filter 47R is 650 kHz. Thus, the process gain is 10*log(76 MHz/650 kHz)=20.7 dB.

Because a first RU only transmits after it has fully synchronized to the M-code, and because it transmits the R-code with a specified phase with regard to its synchronized M-code, a transceiver trying to receive the first RU's transmission need only search a limited number of chip positions to correlate to the first RU's R-code. Due to the finite propagation speed of electromagnetic radiation, the 38 MHz chip clock frequency results in a corresponding chip distance of 7.895 m (25.9 ft). That is, a phase uncertainty of one chip is equivalent to an uncertainty in distance of 7.895 meters between the MU and an RU, and between a pair of RU's, so that a transceiver wishing to receive must search over multiple successive chips to find the phase that synchronizes its locally generated PRDS with a transmitting transceiver's M-code or R-code. In order to test whether correlation has been achieved, it is necessary over a preselected response time to measure the energy corresponding to each of a successive number of bits entering the IF channel 41A of amplifier 41. In the preferred embodiment, the selected response time ("chip search time") is 26.9 μsec, so that 4 bytes totaling 1024 chips are transmitted within a single chip search time. Because separation between two transceivers within the circular network coverage area can be as much as 2×375=750 m, a maximum number of 95 chips must be searched by a receiving transceiver to ensure synchronization to a transceiver transmitting the M-code or R-code.

It will be apparent to those skilled in the art that any one of several techniques can be used to effect correlation. For example, one technique is to synchronize the receiver-generated PRDS code with a received PRDS code segment by detecting a maximum correlation signal as the receiver PRDS code bit sequence is repetitively phase-shifted by one bit relative to the received code segment. Another technique is to perform a "bounding search" wherein a priori information is used to select the bit in the receiver-generated code having the highest probability of achieving correlation and searching successively further along the bit sequences immediately preceding and following that bit.

The MU transmits continuously a third PRDS code (P-code) 31P preselected from among 1,023 Gold-code sequences that can be generated from a third PRCG 31S including first and second 10-bit LFSR's 50C, 51C. An extra chip is added to the chip code sequence so that the P-code sequence length is 1024 chips, i.e., one thirty-second of the M-code length. The P-code is code-locked to the M-code. That is, each P-code chip has a predetermined one-to-one correspondence with a particular M-code chip, so that successive P-code chips correspond to predetermined M-code chips which are 32 chips apart. The P-code is also phase-locked to the M-code. That is, the "all-one's" (ALL1S) position of the P-code exactly aligns with that of the M-code, and both code sequences have the same epoch.

It will be apparent to those skilled in the art that regardless of the choice of M-code chip clock frequency and code length, the P-code chip clock frequency and code length are arbitrary provided that the P-code clock frequency is evenly divisible into the M-code clock frequency and the M-code and P-code have the same epoch.

The P-code is generated at a chip clock frequency which is one thirty-second of the M-code chip clock frequency. The bandwidth of an unfiltered spilot signal thus generated is one thirty-second the bandwidth of the unfiltered spread spectrum Main signal.

In the preferred embodiment, first and second spilot signals, a Low Spilot signal 56 and a High Spilot signal 57 are continuously and concurrently transmitted to mitigate fading effects which might temporarily prevent spilot reception by RU's. The Low Spilot unspread carrier is at 2404.000 MHz and the High Spilot unspread carrier is at 2480.000 MHz, i.e., near the lower and upper ends of the 2400–2483.5 MHz band. The P-code chip clock frequency is 1.188 MHz resulting in an unfiltered 2.375 MHz spread spectrum bandwidth. The spilot signals 56, 57 are detected, respectively, in second and third IF channels 41B, 41C (not shown in FIG. 4) of RF amplifier 41 of an RU, each IF channel having a 2.375 kHz bandwidth. Thus, the spilot processing gain in each channel is 30.0 dB.

The spilot signals 56, 57 facilitate synchronization of RU's to the MU, so that it is sufficient for an RU to search no further than 32 chips rather than the worst-case 95 chips to achieve synchronization between an RUI and an RUR. Since the spilots run continuously, an RU can always listen on the spilot channels for the P-code, and choose between channels for the stronger signal. As there are 1024 possible code positions and testing each position takes typically about 1.0 msec, the maximum P-code search time is about one second. Once an RU has locked onto the P-code, it holds that phase and frequency and begins searching for the M-code. Because of the one-to-one correspondence between P-code and M-code chips, at worst only 32 phases need be searched. Once an RU synchronizes to the M-code, it continues to lock onto and monitor the M-code. The RU then monitors received data until it synchronizes itself to a packet structure.

Table 1 summarizes the technical parameters for the preferred embodiment.

Figure 6:
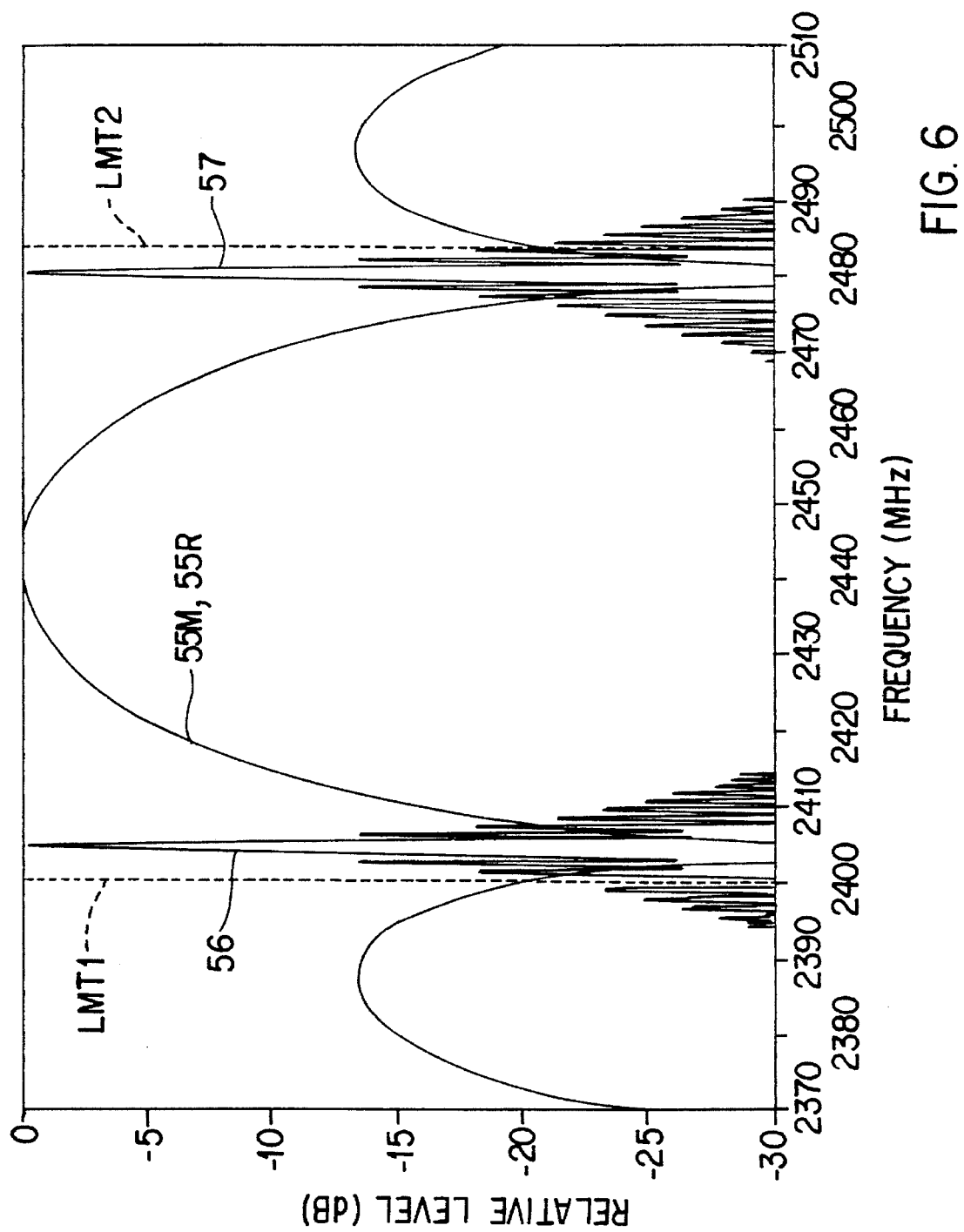
FIG. 6 shows as a function of frequency the relative levels of a DSSS Main signal and first and second DSSS pilot signals transmitted in the 2400–2483.5 MHz band by an RCCE configured as an MU.

FIG. 6 shows graphically, with respect to an FCC-manadated 2400.0 MHz lower band limit LMT1 and a 2483.5 MHz upper band limit LMT2, the relative levels (in decibels) of the main-lobe and side-lobes of the Main signal 55M, 55R for M-code and R-code transmissions, respectively, and the Low and High Spilot signals 56, 57. Table 2 is a detailed itemization by frequency of relative levels of the Mainsig, Low Spilot and High Spilot main-lobe and side-lobes.

II. COMMUNICATIONS PROTOCOL DESCRIPTION

1. Transactions

DSSS TDMA communications within the network 10 are governed entirely by a protocol 80. Network communications consist of a series of transaction cycles 82a, 82b, 82c, . . . , during which any two RU's are always potentially eligible to become the RUI and RUR of the next cycle. Each cycle 82 consists of a sequence of transactions 84a, 84b, 84c, . . . , each transaction 84 being selected from a set of five transaction types: a Long Request Transaction (LRQT) 86; a Long RUR Synchronization Transaction (LRST) 87; a Short Request Transaction (SRQT) 88; a Short RUR Synchronization Transaction (SRST) 89; and a Data and Acknowledge Transaction (DAAT) 90. Selection is determined by the protocol 80 according to the transactions that have already occurred in that cycle, the separations and relative motions among the MU, RUI and RUR, the time elapsed since the last communication between the RUI and RUR and/or the RUI or RUR and the MU, and the possibility of the MU allowing another RU to temporarily become an RUI and thus change an on-going cycle.

2. Subpackets

Each transaction type 86, 87, 88, 89, 90 consists of a predetermined sequence of subpackets 92, each subpacket being one of a set of six subpacket types: Transaction Header (THD) 94; Long Chip Search From RUI (LCSI) 95; Long Chip Search From RUR (LCSR) 96; Short Chip Search (SCS) 97; Data (DAT) 98, and RUR Status Data (RSD) 99. Thus, all transactions of a given type have the same subpacket sequence structure.

Each subpacket type 94, 95, 96, 97, 98, 99 consists of a predetermined sequence of elements, each element being characterized by a specific number of bytes. Thus, each subpacket type 94–99 comprises a predetermined total number of bytes where the ordinal position of each byte predetermines its representation of a specific element or portion thereof.

All transactions begin with a THD 94, 13 bytes long, transmitted by the MU using the M-code. A THD is the only type of subpacket transmitted by the MU. Over a transaction cycle 82 typically totaling several thousand bytes and lasting less than 20 msec, the MU transmits THD's only a few percent of the time, typically less than a total of 0.5 msec.

As shown in FIG. 7A and Table 3, a THD subpacket 94 consists of the following sequential elements: a "synchronization" (Sync) block 102a consisting of 4 bytes; a "subpacket identification" (Sbpkt ID) block 102b consisting of 1 byte; an "acknowledge status" (ACK Status) block 102c consisting of 3 bytes; an "RUI address" (RUI Addr) block 102d consisting of 1 byte; an "RUR address" (RUR Addr) block 102e consisting of 1 byte; a "Cyclic Redundant Check" (CRC) block 102f consisting of 2 bytes; and a "Quiet" block 102g consisting of 1 byte.

The duration of the Sync block 102a equals the chip search time. During this period, RU's are provided with 1024 M-code chips, enabling them to precisely synchronize to the MU by making minor adjustments in the present chip phase. The Sbpkt ID block 102b identifies the particular type of THD being transmitted. At the beginning of a new transaction cycle 82 when the MU broadcasts to all RU's soliciting RUI requests, a first byte value 114a in block 102b informs the RU's the network is presently available. After two RU's have been designated as an RUI and RUR, a second value 114b, third value 114c, or fourth value 114d informs the RUI and RUR that the current transaction is an LRST, SRQT, SRST or DAAT, respectively. The ACK Status block 102c is used to inform the RUI and RUR that an immediately previous transaction was (not) completed successfully. The RUI Addr 102d and RUR Addr 102e blocks are zeroes when the first byte value 114a appears in block 102b, i.e., when the network is available. Once an RU has been designated an RUI, blocks 102d and 102e are assigned, respectively, a unique numerical address, which serve to inform the RUI its request was approved, and inform the intended RUR that it needs to synchronize to the RUI. For subsequent transactions of a cycle, blocks 102d and 102e inform all other RU's of the identities of the current RUI and RUR. The CRC block 102f is used to monitor the integrity of this subpacket. The Quiet block 102g provides a guard-band between subpackets. As 1 byte corresponds to 6.737 μsec during which 256 chips are transmitted, the distance equivalent is 2021 m. Thus, even if the MU transmits a signal from a location on the periphery of the coverage area which is reflected at a diametrically opposite location, the total signal path length is 4×375=1500 m, i.e., less than the chips' distance equivalent, so there is no danger of a reflected signal overlapping into the next subpacket.

The MU always transmits THD's with a zero phase reference ("ZPR") related to a master clock 103 within the MU which is also the master clock for the network 10, and related to the MU's M-code 31M. The MU's ZPR is referred to herein as the "MZPR." Even if the MU has been tracking an RU at some other phase, the MU returns to the MZPR before transmitting the next THD or attempting to synchronize with another RU. The phase of an RU after it has correlated with the MU by the end of a THD is referred to herein as the RU's ZPR ("RZPR").

As shown in FIG. 7B and Table 3, an LCSI subpacket 95 is transmitted from an RUI to the MU and an RUR and consists of the following sequential elements: a 380-byte sequence of digital "0"'s (Zeroes) 104a; a "request permission to become an RUI" (REQ ID) block 104b consisting of 1 byte; an "RUI address" (RUI Addr) block 104c consisting of 1 byte; an "RUR address" (RUR Addr) block 104d consisting of 1 byte; a "Cyclic Redundant Check" (CRC) block 104e consisting of 2 bytes; and a "Quiet" block 104f consisting of 1 byte.

The duration of the Zeroes block 104a equals 95 chip search times, i.e., sufficient time for the MU and RUR to synchronize to the RUI's R-code 31R even for a worst case RUI-to-MU or RUI-to-RUR separation of 2×375=750 m. The REQ ID block 104b informs the MU that the RU whose address appears in RUI Addr block 104c wishes to transmit. The RUR Addr block 104d informs the MU to which RU the prospective RUI wishes to transmit. The CRC block 104e and Quiet block 104f have the same functions as blocks 102f and 102g, respectively.

As shown in FIG. 7C and Table 3, an LCSR subpacket 96 is transmitted from an RUR to the MU and RUI and consists of the following sequential elements: a 381-byte sequence of digital "0"'s (Zeroes) 106a; a "synchronization to an RUI achieved" (RSA ID) block 106b consisting of 1 byte; an "RUR address" (RUR Addr) block 106c consisting of 1 byte; a "Cyclic Redundant Check" (CRC) block 106d consisting of 2 bytes; and a "Quiet" block 106e consisting of 1 byte.

The duration of the Zeroes block 106a equals 95 chip search times, i.e., sufficient time for the MU and RUI to synchronize to the RUR's R-code even for a worst case RUR-to-MU or RUR-to-RUI separation of 750 m. The RSA ID block 106b informs the MU and RUI that the RUR whose address appears in RUR Addr block 106c has synchronized to the RUI's R-code. The CRC block 106d and Quiet block 106e have the same functions as blocks 102f and 102g, respectively.

Figure 7D:
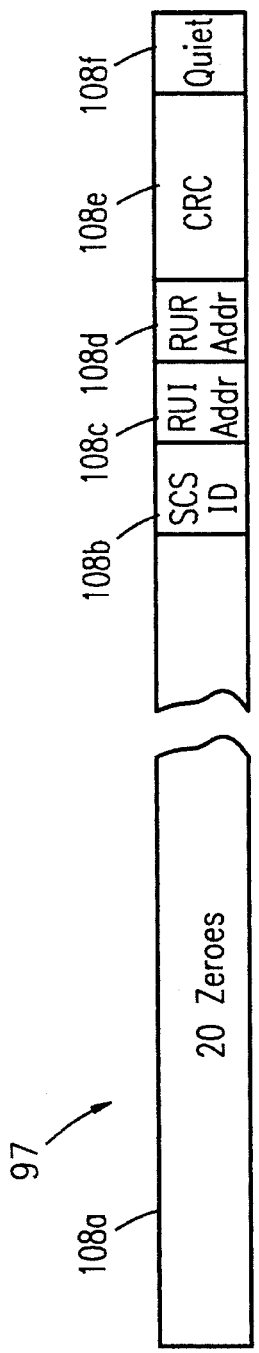
FIG. 7D depicts the communication format utilized by a short chip search (SCS) subpacket of the invention protocol.

As shown in FIG. 7D and Table 3, an SCS subpacket 97 is transmitted from an RUI to the MU and RUR, or from an RUR to the MU and RUI, and consists of the following sequential elements: a 20-byte sequence of digital "0"'s (Zeroes) 108a; a "subpacket identification" (SCS ID) block 108b consisting of 1 byte; an "RUI address" (RUI Addr) block 108c consisting of 1 byte; an "RUR address" (RUR Addr) block 108d consisting of 1 byte; a "Cyclic Redundant Check" (CRC) block 108e consisting of 2 bytes; and a "Quiet" block 108f consisting of 1 byte.

The duration of the Zeroes block 108a provides sufficient time for the MU and RUR (or RUI) to search a total of 5 chip positions to enable resynchronization to an RUR's (or RUI's) R-code. The SCS ID block 108b confirms to the MU that the RUI whose address appears in RUI Addr block 108c or the RUR whose address appears in RUI Addr block 108d is transmitting for the purpose of resynchronization. The CRC block 108e and Quiet block 108f have the same functions as blocks 102f and 102g, respectively.

Figure 7E:
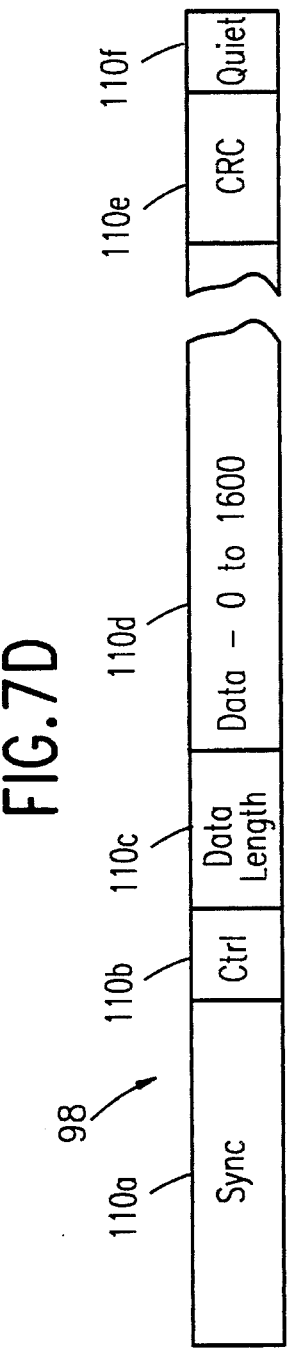
FIG. 7E depicts the communication format utilized by a data (DAT) subpacket of the invention protocol.

As shown in FIG. 7E and Table 3, a DAT subpacket 98 is transmitted from an RUI to the RUR and MU and consists of the following sequential elements: a "synchronization" (Sync) block 110a consisting of 4 bytes; a "Control" block 110b consisting of 1 byte; a "Data Length" block 110c consisting of 2 bytes; a "Data" block 110d consisting of 0 to 1600 bytes; a "Cyclic Redundant Check" (CRC) block 110e consisting of 2 bytes; and a "Quiet" block 110f consisting of 1 byte.

The Sync block 110a has the same function as block 102a. A first (or second) byte value in the Control block 110b informs the MU and RUR that the RUI does (not) wish to transmit a follow-on DAT subpacket. The Data Length block 110c informs the RUR and MU of the number of data bytes to be transmitted in the current DAT subpacket. The Data block 110d has a variable length, consisting of from 0 to 1600 bytes. The CRC block 110e and Quiet block 110f have the same functions as blocks 102e and 102g, respectively.

Figure 7F:
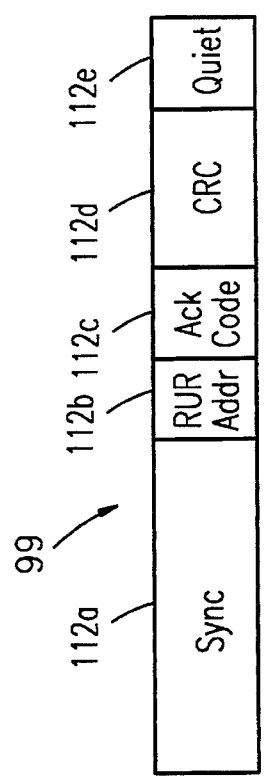
FIG. 7F depicts the communication format utilized by an RUR status data (RSD) subpacket of the invention protocol.

As shown in FIG. 7F and Table 3, an RSD subpacket 99 is transmitted from the RUR to the MU and RUI and consists of the following sequential elements: a "synchronization" (Sync) block 112a consisting of 4 bytes; an "RUR address" (RUR Addr) block 112b consisting of 1 byte; an "Acknowledge Code" (ACK Code) block 112c consisting of 1 byte; a "Cyclic Redundant Check" (CRC) block 112d consisting of 2 bytes; and a "Quiet" block 112e consisting of 1 byte.

The Sync block 112a has the the same function as block 102a. The RUR Addr block 112b informs the MU and RUI of the identity of an RU reporting in ACK Code block 112c that it has (not) successfully received a DAT subpacket 98. The CRC block 112d and Quiet block 112e have the same function as blocks 102f and 102g, respectively.

Referring to Table 4, an LRQT 86 consists of a THD 94 followed by an LCSI 95, the LRQT totaling 399 bytes and lasting 2.688 msec. Thus, an MU broadcast of a THD inviting RU's to request network access generally will be followed by an RU transmitting an LCSI informing the MU that the RU wishes a link assignment in order to send data to another RU or to the MU itself, and enabling the MU and the other RU to synchronize themselves to the RU's R-code. During each LRQT, the MU must attempt to synchronize to a possible incoming RU transmission. At each LRQT, any RU can ask for a link. The LRQT allows an RU to be anywhere in the range of 0 to 375 m from the MU, corresponding to a phase difference of 47.5 chips. In the preferred embodiment, the MU searches a range of 0 to −95 chips using a random process to choose the order in which chip positions are searched so that RU's at all distances have an equal opportunity for access. Alternatively, the MU can search: linearly with increasing chip distance, enabling nearer RU's to have easier access; linearly with decreasing chip distance, giving more distant RU's easier access; or using preselected chip ranges coinciding with ranges at which RU's are known to be located.

If more than one RU simultaneously requests permission to become an RUI and there are two or more RU's at the same chip distance, a "destructive"-type collision occurs. A contending RU will then not see its address appear in the RUI Addr block 102d of the next THD 94. Using its own address as a seed, each contending RU uses a random back-off generator 116 initializing an algorithm using 2-bit logic to choose its next LRQT access. If the MU still does not respond by selecting an RUI, each contending RU increases the number of bits in the back-off algorithm and transmits a follow-on LCSI.

Whenever an RU is not transmitting, as a potential RUR it tries to listen to the R-code transmissions from other RU's, so that it is ready to respond as an RUR should the MU so authorize. Thus, each non-transmitting RU upon decoding byte value 114a in block 102b of a THD attempts to synchronize to the LCSI. As long as there is no collision between contending RU's, the other RU's can synchronize with the RUI just as would the MU. As does the MU, RU's use a linear search over a range of 0 to −95 chips. The 95 chips account for twice the maximum possible distance between the MU and any RU. When an RU receives a signal from an RUI, the total phase delay equals the combined delay from the MU to the RUI and from the RUI to that RU. The 95 chip delay occurs when the RU is collocated with the MU and the RUI is 47.5 chips away.

An LRST 87 consists of a THD 94 followed by an LCSR 96, the LRST totaling 399 bytes and lasting 2.688 msec. The LRST enables the MU and RUI to synchronize to the RUR's Rcode. An LCSR is transmitted by an RU upon receipt of a THD containing byte value 114b in block 102b and that RU's address in RUR Addr block 102e. RSA ID block 106b informs the MU and RUI that the RUR is synchronized to the RUI's Rcode so that data transfer can proceed.

The MU offers SRQT transactions periodically by inserting the byte value 114c in block 102b of a THD so that an RUI which believes its distance from the MU and from an RUR to which the RUI has recently transmitted have not changed can attempt to reestablish that link without incurring the time delay required by an LRQT and LRST. Referring to Table 4, an SRQT 88 consists of a THD 94 followed by an SCS 97, the SRQT totaling 39 bytes and lasting 0.263 msec. For an SRQT, the MU searches a range of −2 to +2 chips using a linear search method. Should MU-to-RUI separation change by more than about 1½ chips equivalent distance, transmitting an SCS will not enable the MU to find the correct phase of the RUI. Having failed at a first attempt, the MU by again inserting byte value 114c in Sbpkt ID block 102b requests the RUI to transmit another SCS. Should this attempt also fail, the MU reverts to soliciting LCSI's by broadcasting an LRQT-type THD.

Clock drift between the MU and RU's contributes negligibly to chip error rate. When receiving R-code, the MU tracks the phase of incoming signals using quarter-chip jumps in the PRDS R-code 31R, rather than changing the basic rate of the master clock 103. Following receipt of a transmission from an RU, the MU reports the total phase difference between its ZPR and the phase necessary to correlate to the RU in the ACK Status block 102c of the next transaction's THD. The 3-byte ACK Status block 102c consists of: the address of the RU being acknowledged (1 byte); an acknowledge code (2 bits); and chip distance (14 bits). The chip distance maintains the phase error measured with respect to the MU MZPR. During normal operation, the longest interval between THD's is 11.0 msec. In this time, for a typical total chip clock error rate of 0.2 ppm, the maximum drift of phase compared to a previously properly adjusted phase is 0.2 ppm×11 msec=2.2 nsec, or slightly less than 0.1 chip time. Thus, an RU will always be quite close to the correct phase of the MU when attempting to resynchronize after the maximum non-tracking period of 11.0 msec. During normal operation, the equivalent drift between an RUI and an RUR will be twice the drift of an RU with respect to the MU, or 0.4 ppm, i.e., less than ¼ chip time.

Assuming that the MU and all RU's never move faster than 44 ft/sec (30 MPH), about 0.8 sec will elapse before the fastest RUI changes its separation from a stationary MU by the distance equivalent of 1½ chips. Assuming that RU's typically move slower than 7 ft/sec, the distance equivalent of 1.5 chips is about 5 sec.

Should an SRQT be successful, the MU schedules an SRST which, as for the SRQT, assumes minimum movement between the RUR and MU as well as between the RUR and RUI. Referring to Table 4, an SRST 89 consists of a THD 94 followed by an SCS 97, the SRST totaling 39 bytes and lasting 0.263 msec. If the SRST is unsuccessful so that the MU fails to synchronize to the RUR after two attempts, the MU then transmits an LRST-type THD directing the RUR to transmit an LCSR.

When the MU synchronizes to an incoming LCSI, LCSR or SCS, it reads the address and request-type of the requesting RU. The MU then transmits an ACK Status block 102c in the next THD indicating the "success" of the RU's request of the previous transaction.

Referring to Table 4, a DAAT 90 consists of a THD 94 followed by a DAT 98 and an RSD 99. For a maximum length data transmission, the DAT totals 1632 bytes and lasts 10.994 msec. Byte value 114d appearing in Sbpkt ID block 102b of a THD directs the RUI to begin transmitting data to the RUR. By reading the DAT Control block 110b, the MU and RUR can determine whether the RUI has more data to send. The RSD 99 sent by the RUR informs the MU and RUI whether or not the DAT 98 was successfully received.

A "virtual link" for a particular (RUI, RUR) pair is maintained when the Control block 110b indicates a follow-on DAT but the DAT Data block 110d contains zero bytes. The RUI transmits a series of zero-length DAT subpackets 98 for as long as it wants the virtual link maintained. When the RUI is ready to use the link for transmitting data, it responds at an SRQT 88 offered by the MU by transmitting an SCS subpacket 97. The MU can then synchronize to the phase of the RUI in a short time because the MU-to-RUI separation will not have changed appreciably since the last DAAT transaction. The MU inserts an indicator byte in the ACK Status block 102c of the next THD informing the RUI it has the link. The MU then initiates an SRST transaction 89 to enable itself and the RUI to synchronize to the intended RUR. The MU then offers a DAAT transaction 90 to the RUI, to which the RUI responds with a DAT 98, indicating the number of data bytes.

The MU does not sequence transactions in a cycle 82 deterministically. A typical transaction sequence is: LRQT, LRST, DAAT, SRQT, SRST, DAAT, SRQT, SRST, DAAT, SRQT, SRST, DAAT, . . . For the cycle shown in Table 4 consisting of two LRQT's, two LRST's, six SRQT's, six SRST's and eight DAAT's, the total cycle time is 101.86 msec and the data transfer rate is 1.005 Mbps, when each DAT includes 1600 bytes of data.

When the network 10 operates in a "client-server" application, the MU is the server and the RU's are clients. All of the transaction types LRQT, LRST, SRQT, SRST and DAAT are used. The MU has an address in the normal RU range so the protocol 80 will accept the MU as a valid RU. Either the MU requests a link and becomes an RUI, the RU to which it is linking becoming the RUR, or an RU requests a link and the MU becomes the RUR. In client-server applications, the protocol 80 prevents RU's from requesting links to another RU.

For applications which require only a single pair of transceivers, i.e., an MU and an RU, the protocol can be simplified so that the MU functions both as an MU and an RU (RU2), the other RU being RU1. For the simplified protocol to operate, both the MU and RU1 are configured for two-transceiver operation. To make this simplified system less expensive, the spilots are not used and spilot-related hardware can be eliminated from the transceivers. To still maintain easy chip-phase searching for RU1, the MU sends its THD's via the R-code. Therefore, all transmissions are on the R-code. The MU knows when RU1 is not in normal operation, and so continually offers LRQT's. Thus, when RU1 is in start-up operation, it will find the MU transmitting LRQT's most of the time and thus will easily find the correct chip phase at which to correlate. Once RU1 links to the MU, fewer transactions are necessary to effect a link or a data transfer because the MU knows where both RU1 and RU2 are and does not need to use RUR-type transactions.

3. Typical Scenarios

A. Scenario 1 a. Summary

RU 1 (RU1) wishes to send a 200-byte message to RU 2 (RU2). RU1 has not recently communicated with MU and so needs to get a link via an LRQT. No other RU's are requesting a link, so when MU offers an LRQT, RU1's bid is immediately successful. RU2 synchronizes to RU1 during the LRST of the LRQT. MU initiates an LRST addressed to RU2 to enable RU1 and itself to synchronize to RU2. MU initiates a DAAT, RU1 sends the data, and RU2 acknowledges data receipt with an RSD received by MU and RU1. MU acknowledges receiving RU2's RSD in the THD of the next transaction. The trasaction cycle consists of one LRQT (419 bytes), one LRST (419 bytes) and one DAAT (232 bytes) and lasts for 7.21 msec.

b. Details

1. If not already synchronized to the MU, RU1 synchronizes, first via Low Spilot signal 56 or High Spilot signal 57, and then via a THD. When RU1 is fully synchronized, it looks for an LRQT.

2. When RU1 decodes a THD identifying an LRQT, it transmits a request for a link to RU2 during the LCSI of that LRQT.

3. During the LCSI, MU synchronizes to RU1 and decodes RU1's link request. MU includes an indicator in the ACK Status block 102c of the next THD informing RU1 it has been designated as an RUI. MU retains the phase information of RU1 from the block 102c.

4. During the LCSI, RU2 also synchronizes to RU1 and, having decoded RUI's LCSI, identifies itself as the intended RUR.

5. RU2 decodes the THD of the transaction following the LRQT and sees that RU1 is the RUI.

6. MU initiates an LRST to enable RU1 and itself to synchronize to RU2.

7. RU2 recognizes its address in the LRST THD and responds with an LCSR including a byte in RSA ID block 106b indicating RU2 is synchronized to RU1 and ready to receive data.

8. MU synchronizes to RU2 during the LCSR and decodes the block 106b.

9. RU1 also synchronizes to RU2 during the LCSR and now knows that RU2 is synchronized to it and ready to receive data.

10. MU transmits a DAAT-type THD identifying RU1 as the RUI and RU2 as the RUR.

11. RU1 recognizes its address in the THD and responds by transmitting a DAT 98 wherein the byte in Control block 110b signifies "this is the only DAAT I need," the byte count in Data length block 110c is "200", and the Data block 110d contains 200 bytes of data.

12. RU2 recognizes its address in the THD, receives the DAT 98 and responds with an RSD 99 to close out the transaction.

13. MU receives the RSD from RU2 and so knows that RU2 successfully received the data.

14. RU1 also receives the RSD from RU2 and so knows that RU2 successfully received the data.

15. On the next transaction following the DAAT, MU indicates in ACK Code block 112c of its THD that it received RU2's RSD.

16. RU1 decodes block 112c and sees that MU knows the data was successfully transferred.

17. MU is free to offer an LRQT or SRQT because it knows that RU1 needed only one DAAT.

B. Scenario 2 a. Summary

RU1 wishes to send a long message of unknown length to RU2. RU1 recently has been an RUI and so can respond to an SRQT. RU2 recently has been an RUR and so can respond to an SRST. Once a link is opened, it remains open and RU1 continues to send data to RU2. The transaction cycle consists of one SRQT (39 bytes), one SRST (39 bytes) and as many DAAT's (each totaling 1,632 bytes) as are required.

b. Details

1. RU1 successfully requests a link via an SQRT, RU2 synchronizing to RU1 during the SQRT SCS.

2. MU transmits an SRST-type THD and RU2 responds with an SCS enabling RU1 and MU to synchronize with RU2.

3. Data transmissions begin as in steps 10–16 of Scenario 1 except that the Control block 110b in DAT 98 signifies another DAAT is coming. Each DAAT contains 1600 bytes of data.

4. MU continues to assign DAAT's to RU1 as RUI and RU2 as RUR as long as RU1 continues to indicate in each Control block 110b that more data is coming.

5. RU2 continues to acknowledge proper receipt of data via the RSD 99 in each DAAT.

6. When RU1 has no more data to send, it so indicates in its last DAT via Control block 110b.

7. MU, RU1 and RU2 close out the link.

C. Scenario 3 a. Summary

RU1 wishes to send a short message to RU2 while keeping the link open for future communication. The sequence of transactions is the same as for Scenario 2 except that RU1 transmits zero-length DAT's to keep the link open until ready to send data. The transaction cycle consists of one SRQT (39 bytes), one SRST (39 bytes) and as many DAAT's (minimum of 10 bytes each) as are required. The overhead for keeping a link open is 32 bytes (or about 205 μsec). Thus, 50 zero-data length DAAT's are approximately equivalent to a single fully loaded (1600 data bytes) DAAT.

b. Details

1. RU1 successfully requests a link via an SQRT, RU2 synchronizing to RU1 during the SQRT SCS.

2. MU transmits an SRST-type THD and RU2 responds with an SCS enabling RU1 and MU to synchronize with RU2.

3. Data transmissions begin as in step 3 of Scenario 2. Initial DAAT's contain data bytes; subsequent DAAT's do not.

4. MU continues offering DAAT's to RU1 as RUI and RU2 as RUR as long as RU1 continues to indicate in each Control block 110b that it needs more DAAT's.

5. RU2 continues to acknowledge proper receipt of DAT's, including those of zero-data length, via the RSD 99 in each DAAT.

6. When RU1 no longer wishes the link kept open, it so indicates in its last DAT via Control block 110b.

7. MU, RU1 and RU2 close out the link.

D. Scenario 4 a. Summary

In a client-server application, MU is the server and there is a multiplicity of RU clients. Client RU1 wishes to send a 200 byte message to the server MU and does not need thereafter to maintain the link. The transaction cycle consists of one LRQT (399 bytes) and one DAAT (210 bytes) and lasts for 4.10 msec.

b. Details

1. MU offers an LRQT and RU1 requests a link to the MU as an RUR.

2. MU grants the link to RU1 via the THD of the next transaction. Because RU1 and MU are necessarily synchronized after the LRQT, there is not need for an LRST.

3. MU transmits a DAAT-type THD and RU1 responds by sending a 200 byte DAT. MU acknowledges data receipt via a RSD.

4. MU indicates link termination in the next THD.

E. Scenario 5 a. Summary

In a client-server application as in Scenario 4, MU wishes to send a 200 byte message to RU1 and does not need thereafter to maintain the link. It has been a long time since MU last linked to RU1, so MU assumes an LCSR is necessary. The trasaction cycle consists of one LRST (399 bytes) and one DAAT (210 bytes) and lasts for 4.10 msec.

b. Details

1. MU transmits an LRST-type THD designating RU1 as the RUR.

2. RU1 responds with an LCSR including a byte in RSA ID block 106$b$ indicating RU1 is synchronized to MU.

3. MU synchronizes to RU1 via the LCSR.

4. MU transmits a DAAT-type THD wherein MU is the RUI and RU1 is the RUR, followed by a DAT including 200 bytes of data.

5. RU1 receives the DAT and responds with an RSD.

6. MU indicates link termination in the next THD.

III. HARDWARE DESCRIPTION

1. RCCE Overview

Figure 8:
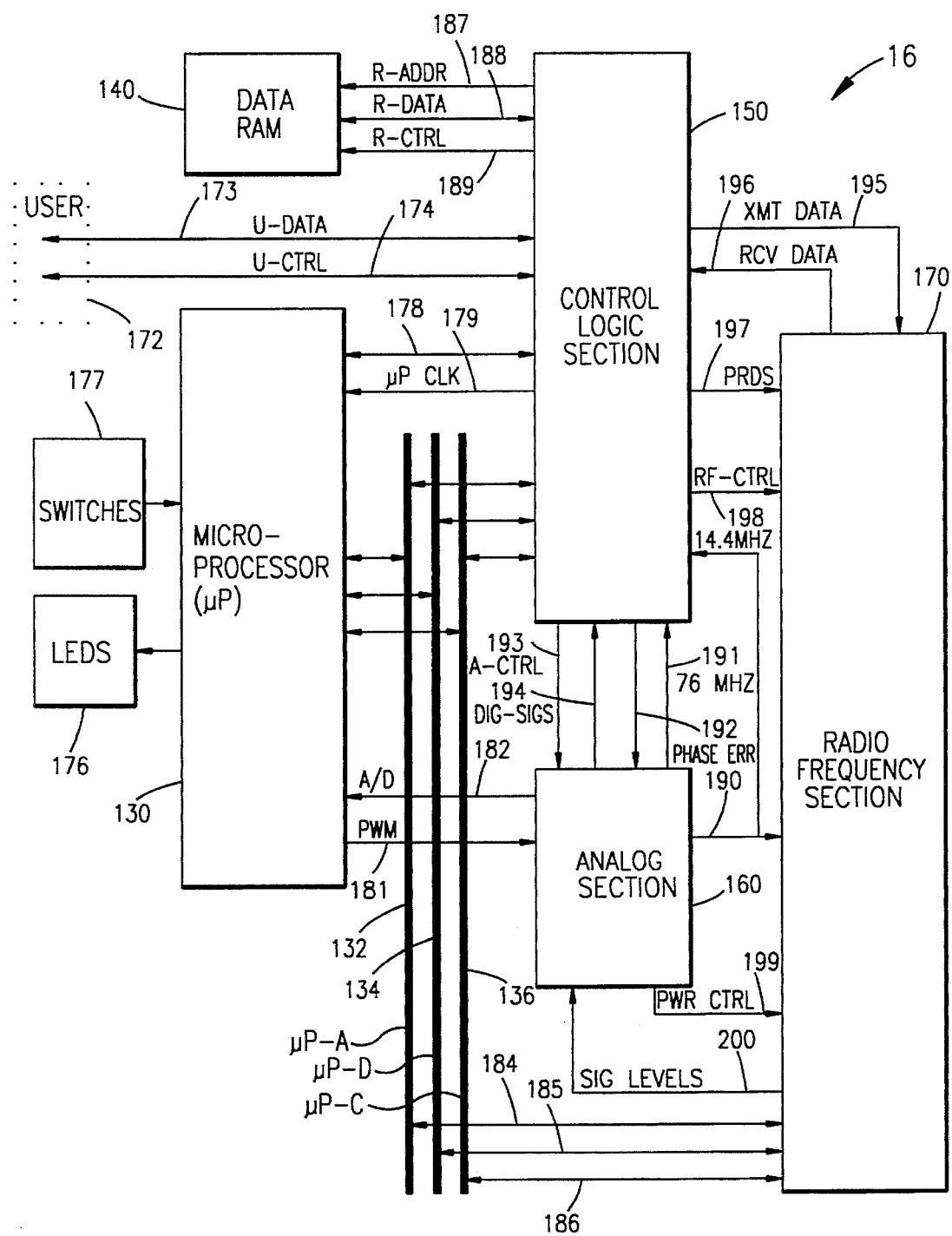
FIG. 8 is a block diagram of a wireless transceiver according to the invention, including a microprocessor, an external RAM, three external busses, a Control Logic Section, an Analog Section, and a Radiofrequency Section.

Referring to FIG. 8, an RCCE transceiver 16 implementing the RadioNet protocol 80 comprises a microprocessor 130, an external memory address bus ("μP-A") 132, an external memory data bus ("μP-D") 134, and an external memory control bus ("μP-C") 136 enabling the microprocessor 130 to communicate with other sections of the transceiver 16, an external Data RAM 140, a Control Logic Section 150, an Analog Section 160 and a Radiofrequency Section 170.

In the following description, the term "line" is intended as a synonym for a signal carried by the line in question from one portion of the RCCE to another.

The transceiver 16 includes appropriate hardware and firmware enabling configuration as an MU or an RU. The transceiver 16 connects to a PC or other user device 172 through a user-provided interface via a plurality of data lines ("U-DATA") 173, and a plurality of timing and status signal control lines ("U-CTRL") 174. User data in the form of 8-bit bytes on data (U-DATA) lines 173 are controlled by the U-CTRL lines 174. U-DATA signals are bi-directional, i.e., data flows both to and from the transceiver 16. The data rate is application-dependent. U-CTRL signals include read/write, data flow direction, handshake and data/control signals. The transceiver further includes a plurality of LED indicators 176 and a plurality of switches 177 providing, respectively, visual state indications and manual control to a human operating the device 172. Communication and data management functions relating a particular application's communication needs to RCCE data and timing formats are implemented by the user.

The microprocessor 130 interfaces with the Control Logic Section 150 via a plurality of I/O signal lines 178 and a digital clock input signal ("μP CLK") 179. The microprocessor 130 interfaces with the Analog Section 160 via a plurality of digital PWM output signals 181 including PWM signals 181A and 181B, and an A/D input signal 182. The microprocessor 130 interfaces directly with the Radiofrequency Section 170 via three signal lines 184, 185 and 186 connecting the Radiofrequency Section with a plurality of memory-mapped registers 132R, 134R, 136R (not shown), on the external busses 132, 134 and 136. The Control Logic Section 150 interfaces with the external Data RAM 140 via a bus ("R-ADDR") 187, a bus ("R-DATA") 188, and a bus ("R-CTRL") 189. The Control Logic Section 150 interfaces with the Analog Section 160 via a 14.4000 MHz clock signal 190, a 76.000 MHz digital clock signal 191, a phase error signal 192, a plurality of analog control digital signals ("A-CTRL") 193, and a plurality of RSSI comparison digital signals ("DIG-SIGS") 194. The Control Logic Section 150 interfaces with the Radiofrequency Section 170 via a pair of transmit data control signal lines ("XMT DATA") 195, a pair of receive data control signal ("RCV DATA") lines 196, a PRDS signal 197 from a PRDS bus 197B (not shown), and a plurality of Radiofrequency Section control signal lines ("RF-CTRL") 198. The Analog Section 160 interfaces with the Radiofrequency Section 170 via the 14.4000 MHz clock signal 190, a power control signal ("PWR CTRL") 199, and a plurality of signal levels ("SIG LEVELS") 200 output from the Radiofrequency Section 170.

2. Microprocessor

The microprocessor 130 provides all functions not directly related to user communication data. These functions include: code selection; code environment testing control; MU/RU selection and set-up; sensing states of the LED indicators 176 and switches 177; controlling power level via A/D for power level sensing, and via PWM for power level setting; fine-tuning clock drift via PWM; monitoring diagnostic information; monitoring user mode, link control, and higher protocol interface(s); monitoring logical names and addresses of network users and nodes; and loading parameters and constants into the Control Logic Section 150 and the Radiofrequency Section 170. At "Power Up" reset, the microprocessor 130 initializes the states of all RCCE subsections.

The microprocessor 130 communicates with other sections of the transceiver 16 via the 16-bit external memory address (μP-A) bus 132, the 8-bit data (μP-D) bus 134, and the external memory control (μP-C) bus 136. Appropriate clocks and timing pulses within the μP-C bus 136 enable the microprocessor 130 to transfer byte data between external memory-mapped registers 132R, 134R and 136R (not shown). Discrete control of bit-oriented, timing-critical I/O is enabled via the I/O signal lines 178. The microprocessor 130 operates from the 7.2 MHz digital clock (μP CLK) signal 179 input by the Analog Section 160.

The microprocessor 130 is an 8-bit general purpose, relatively fast microcontroller with capabilities including: external RAM addressing; ROM for program execution; a limited amount of RAM for register-type data storage; a limited amount of EEPROM for non-volatile parameter storage; multiplexed high-speed 8-bit A/D conversion enabling processing of filtered analog signals to digital values; a plurality of PWM outputs providing analog levels to set thresholds and power levels; and a plurality of I/O pins for discrete digital input/output and control. Preferably, the microprocessor 130 is a Motorola Corporation 68HC11K4 integrated circuit chip including: eight inputs; four PWM outputs; 16K×8 ROM; 256×8 RAM; 512×8 EEPROM; 2 MHz instruction rate; 64K external address space; and 8 bits independent I/O.

3. Data Random Access Memory

Still referring to FIG. 8, external Data RAM 140 provides buffer storage for digital data messages which the user device 172 is sending or receiving. First and second 2K byte buffers 140A, 140B (not shown) are used alternately for outgoing (transmitted) messages so that while one message is being sent, a second message is assembled as user device 172 inputs the message to transceiver 16. Similarly, third and fourth 2K byte buffers 140C, 140D (not shown) are used for incoming (received) messages. Additionally, Data RAM 140 provides temporary storage for settings, code restart locations, offsets, and chip distance information.

All accesses to Data RAM 140 including address, read/write and timing control, and data path and management, are controlled by the Control Logic Section 150. The microprocessor 130 does not communicate directly to Data RAM 140, but transfers information into and out of the Control Logic Section 150 which then accesses Data RAM 140.

Preferably, the Data RAM 140 is a Hitachi Corporation HM62256 CMOS 32K×8 RAM having a 250 nsec access time.

4. Control Logic Section

Figure 9:
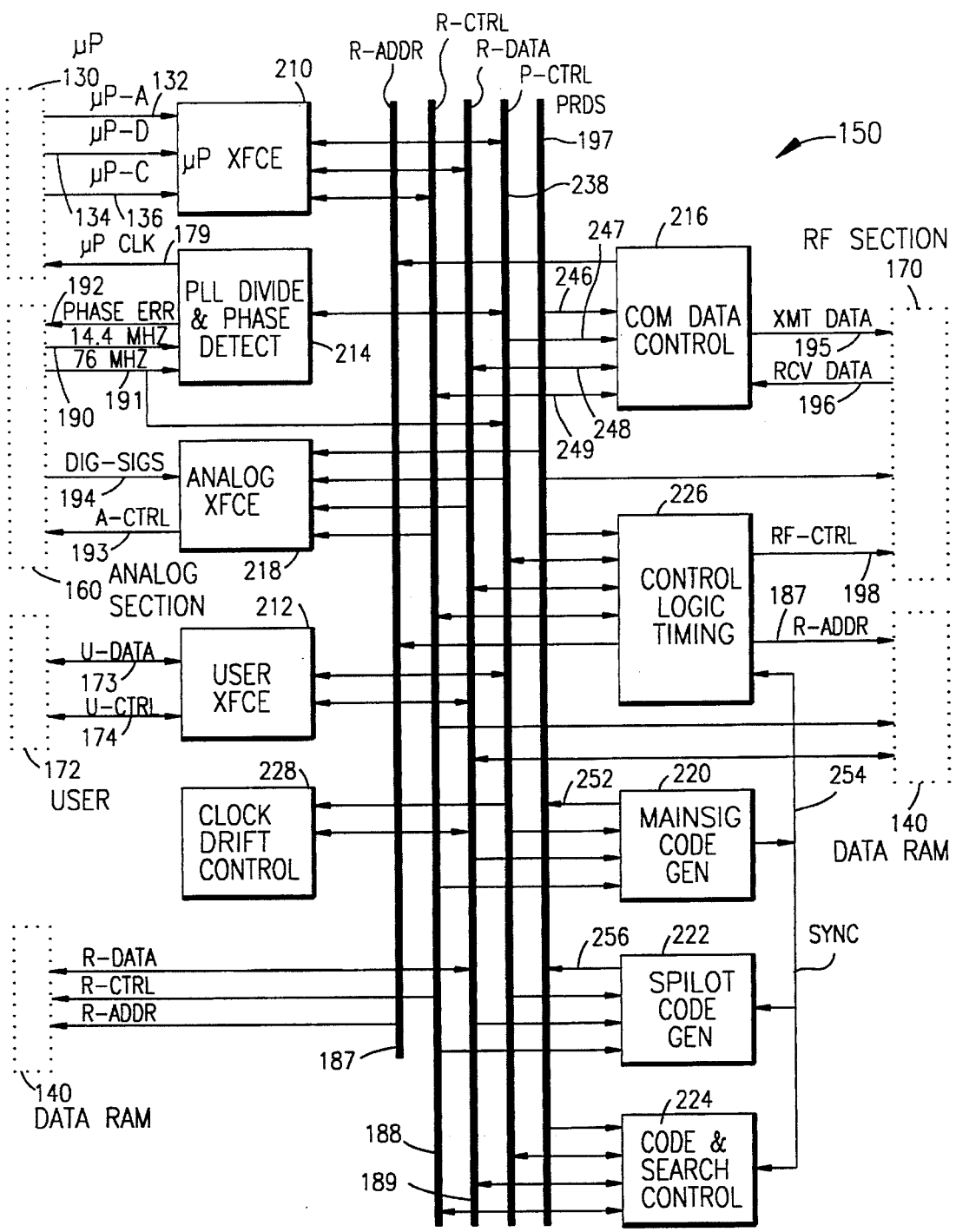
FIG. 9 is a block diagram of the FIG. 8 Control Logic Section, including a microprocessor interface, a user interface, a PLL logic subsection, a communication data control logic subsection, an analog interface logic subsection, a Main signal code generator logic subsection, a spilot code generator logic subsection, a code and search control logic subsection, a control timing logic subsection, and a clock drift control logic subsection.

Referring to FIG. 9, the Control Logic Section 150 includes: an interface ("µP XFCE") 210 with microprocessor 130; an interface ("USER XFCE") 212 with user device 172; a PLL logic ("PLL DIVIDE & PHASE DETECT") subsection 214; a communication data control logic ("COM DATA CONTROL") subsection 216; an analog interface logic ("ANALOG XFCE") subsection 218; a Main signal code generator logic ("MAINSIG CODE GEN") subsection 220; a spilot code generator logic ("SPILOT CODE GEN") subsystem 222; a code and search control logic ("CODE & SEARCH CONTROL") subsection 224; a control logic timing ("CONTROL LOGIC TIMING") subsection 226; and a clock drift control logic ("CLOCK DRIFT CONTROL") subsection 228.

The µP XFCE interface 210 enables the microprocessor 130 to transfer data and set up information to and from other RCCE subsections. The three external busses 132, 134, and 136 enable microprocessor 130 to communicate with a plurality of discrete 8-bit registers 230 (not shown) in interface 210. Handshake and timing pulses on the µP-C bus 136 enable microprocessor 130 to load and/or read four registers in interface 210, a "data-in" register 231, a "data-out" register 232, a "command-in" register 233 and a "command-out" register 234 (not shown). Data are loaded into and out of registers 231, 232, 233, 234 to the COM DATA CONTROL subsection 216 and/or control logic timing subsection 226 through the R-DATA bus 188, the R-CTRL bus 189, and a "PCTRL" bus 238. The three busses R-ADDR 187, R-DATA 188 and R-CTRL 189 provide addressing and control of the DATA RAM 140, and input and output data therefrom by the CONTROL LOGIC TIMING 226 and the COM DATA CONTROL 216 subsections.

The user interface 212 provides direct digital communication between user device 172 and the RCCE. The user reads or writes 8-bit data on the U-DATA bus 173. These data can be either communication data to a remote RCCE 16, or commands to and from the local RCCE or a remote RCCE. Handshake and timing pulses on the U-CTRL bus 174 enable the user 172 to load and/or read four registers in USER XFCE interface 212, a "data-in" register 240, a "data-out" register 241, a "command-in" register 242 and a "command-out" register 243 (not shown). Data are loaded into and out of registers 240, 241, 242, 243 to the COM DATA CONTROL subsection 216 and/or control logic timing subsection 226 through the R-DATA bus 188, R-CTRL bus 189, and P-CTRL bus 238.

The PLL logic subsection 214 provides digital logic for "divide-by" and phase comparison calculations performed in the Analog Section 160.

The COM DATA CONTROL subsection 216 provides address and control information to DATA RAM 140 via bus lines R-ADDR 187 and R-CTRL 188, and inputs or outputs communication data bytes on the R-DATA bus lines 188 and transfers the bytes between Control Section 150 and Radiofrequency Section 170. Communication data are clocked by signals synchronous with the M-code PRDS 31M and R-code PRDS 31R so that one pair of bits, i.e., one symbol, for either input or output is "strobed" once each sixty-four PRDS chips, i.e., once each 1.6842 µsec. Strobe positions are selected to account for delays through the circuitry and networks of Radiofrequency Section 170. Input and output serial data are assembled into pairs of input and output data which are transferred via RCV DATA lines 196 and XMT DATA lines 195, respectively, into or out of subsection 216 each two hundred and fifty-six PRDS chips (=6.7368 µsec). Control signals on P-CTRL bus 238 determine when these transfer processes are enabled. Data bytes are transferred to Data RAM 140 via R-DATA bus 188.

The COM DATA CONTROL subsection 216 also generates and checks a CRC character appended to subpackets 94, 95, 96, 97, 98, 99 by the Control Logic Timing subsection 226, and appearing, respectively, in Cyclic Redundant Character blocks 102*f*, 104*e*, 106*d*, 108*e*, 110*e*, 112*d*. When an error is detected, subsection 216 notifies subsection 226.

The ANALOG XFCE subsection 218 buffers thresholded RSSI DIG-SIGS signals 194 from the Analog Section 160, and provides access to the COM DATA CONTROL subsection 216 and/or CONTROL LOGIC TIMING subsection 226 through R-DATA bus 188, R-CTRL bus 189, and P-CTRL bus 238.

Analog control digital signals (A-CTRL) 193 are generated by decoding PRDS signals on the PRDS bus 197 and signals on the P-CTRL bus 238 to provide appropriate timing resets for the analog RSSI thresholding process.

Spread spectrum code generation for the Main signal is implemented in the MAINSIG CODE GEN subsystem 220 where the modified Gold-code generators 31T and 31R comprise, respectively, 15-bit LFSR's 50A, 51A and SOB, 51B. The 32,767 bit sequence generated by each LFSR is lengthened one bit-time for each pass through the sequence by inserting a "0" output while holding, for one extra chip-clock time, the LFSR state which follows the ALL1S condition in LFSR's 50A and 50B. When LFSR 50A or 50B is in the ALL1S condition, LFSR 51A or 51B, respectively, is preset to a specific position based upon a value stored in a 15-bit preset holding register. When the outputs of LFSR's 50A, 51A or 50B, 51B are exclusive-OR'ed to create a single PRDS digital data stream, each different value in the 15-bit preset holding register causes a different modified Gold-code to be generated. Since there are 32,767 different values which can be preset (zero is not allowed), 32,767 different codes can be generated by each pair of LFSR's. The PRDS codes 31M and 31R generated by the MAINSIG CODE GEN subsystem 220 are input to PRDS bus 197 via a line 252.

Spread spectrum code generation for the spilot signals is implemented in the SPILOT CODE GEN subsystem 222, where the modified Gold-code PRCG 31S comprises 10-bit LFSR's 50C and 51C. The 1,023 bit sequence generated by the LFSR 50C or 51C is lengthened one bit-time for each pass through the sequence by inserting a "0" output while holding, for one extra chip clock-time, the LFSR state which follows the ALL1S condition in LFSR 50C. Subsystem 222 is operated by a chip clock having a frequency one-thirty-second that of and synchronous with the clock of subsystem 220. As for the MAINSIG CODE GEN subsystem 220, an ALL1S condition in LFSR 50C causes LFSR 51C to be preset to a specific position based upon a value stored in a preset holding register. When the outputs of LFSR's 50C and 51C are exclusive-OR'ed to create a single PRDS digital data stream, each different value in the 10-bit preset holding register causes a different modified Gold-code to be generated.

Subsystem 222 is initialized by a synchronization ("SYNC") signal 254 generated by subsystem 220 when subsystem 220 reaches the ALL1S condition. Since the length of the P-code 31P is exactly one-thirty-second of the M-code 31M, and the clock of subsystem 222 has exactly one-thirty-second the frequency of the clock of subsystem 220, the PRDS's 31M and 31P are intimately locked in phase to each other, and both epochs are exactly the same length. PRDS codes 31P generated by the SPILOT CODE GEN subsystem 222 is input to PRDS bus 197 via a line 256.

For an RCCE operating as an MU, the PRCG 31S is used to create the continuously running P-code 31P. For an RCCE operating as an RU, PRCG 31S tracks the incoming P-code signal 31P during "cold" searching, i.e., when the RU has not previously synchronized with the MU's M-code 31M.

The CODE & SEARCH CONTROL subsection 224 provides timing and control for advancing or maintaining the phase of the modified Gold-code PRCG's 31T, 31R, 31S, and for initializing the codes 31M, 31R, 31P at appropriate times during the protocol 80.

Subsection 224 uses both the SYNC signal 254 and signals on the P-CTRL bus 238 to determine how long each chip search should be, and when to increment the search chipphase. Subsection 224 also provides appropriate offset delays to account for phase values when an MU (or RU) needs to establish a specific phase with respect to its MZPR (or RZPR). Subsection 224 further provides command and control signals to R-DATA bus 188 and P-CTRL bus 238 which are used by the other subsections of Control Logic Section 150.

The CONTROL LOGIC TIMING subsection 226 establishes overall timing for the protocol 80 and also provides timing control for the entire Control Logic Section 150. Subsection 226 is synchronized by the SYNC signal 254 generated by MAINSIG CODE GEN subsystem 220. Subsection 226 also creates basic control signals for P-CTRL bus 238 which are synchronized with signals on PRDS bus 197, and generates read/write control signals for R-CTRL bus 189 and the R-ADDR signals 187 which provide access to and from Data RAM 140. Subsection 226 further determines when Radiofrequency Section 170 should be transmitting or receiving via RF-CTRL line 198. Subsection 226 still further appends appropriate headers and CRC information to transaction subpackets during message generation, and parses information during message reception.

The CLOCK DRIFT CONTROL subsection 228 is used only when an RCCE is operating as an RU. Subsection 228 includes a plurality of counters 258 (not shown) to measure the amount of correction that CODE & SEARCH CONTROL subsection 224 must do to maintain correlation while tracking the MU during normal protocol operation. Subsection 228 provides count data from the counters 258 to microprocessor 130 via interface 210, enabling the microprocessor to do micro-adjustments to the control voltage of a VCTCXO 270 in Analog Section 160, thereby reducing the VCTCXO drift rate to near zero.

Preferably, the Control Logic Section 150 is a custom designed 10,000-gate CMOS gate array fabricated from an OKI Corporation MSM10S0110 ASIC, running as a synchronously clocked logic element with a 76 MHz basic clocking term.

5. Analog Section

Figure 10:
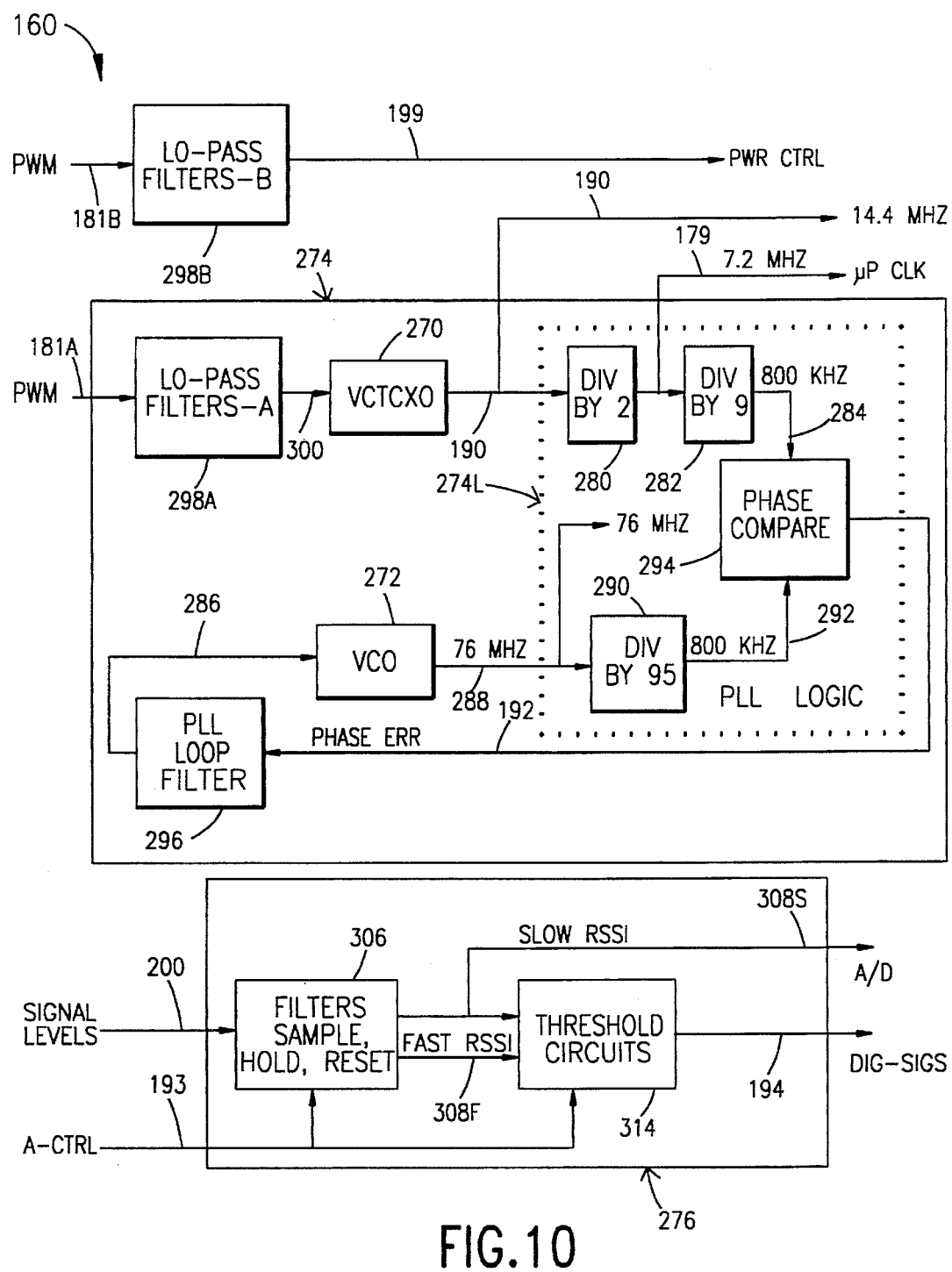
FIG. 10 is a block diagram of the FIG. 8 Analog Section, including a PLL subsection, a signal levels-to-digital signals converter subsection, a power control subsection, a VCTCXO and a VCO.

Referring to FIGS. 9 and 10, the Analog Section 160 includes: the VCTCXO 270; a VCO 272; a phase locked loop ("PLL") subsection 274 including a PLL logic ("PLL LOGIC") portion 274L; a signal levels-to-digital signals converter subsection 276; and a "LO-PASS FILTERS-B" subsection 298B.

PLL subsection 274 provides three highly stable digital clock frequencies: 14.4000 MHz via line 190 to subsection 214 of Control Logic Section 150; 7.200 MHz indirectly to microprocessor 130 via subsection 214 and line 179; and 76.000 MHz to subsection 214 via line 191. The 14.4000 MHz signal is the source of all RF frequencies used in Radiofrequency Section 170. The 76.000 MHz signal is the source of the chip clock used throughout Control Logic Section 150.

PLL subsection 274 uses digital logic from Control Logic Section 150 to provide "divide-by" and "phase compare" functions in PLL LOGIC 274L. The 14.4 MHz signal 190 is divided by two in a logic element 280 to provide the µP CLK signal 179. The µP CLK signal 179 is divided by nine in a logic element 282 to provide an 800 kHz first reference signal 284. VCO 272 is caused to oscillate at a frequency very close to 76 MHz by a control voltage 286, generating a signal 288 which is divided by ninety-five in a logic element 290 to provide an 800 kHz second reference signal 292. The signals 284 and 292 are phase compared in a logic element 294 to obtain the phase error signal 192 which is filtered by a filter ("PLL LOOP FILTER") 296 to produce the VCO control voltage 286. Because subsection 274 stabilizes with the two 800 kHz signals 284 and 292 exactly equal in frequency and phase, the 76 MHz signal 288 is precisely phase-locked to the 14.4 MHz signal 190.

For an RCCE operating as an RU, the frequency of VCTCXO 270 is periodically micro-adjusted by microprocessor 130 to account for drift detected during long-term operation relative to the MU's chip clock frequency. Microprocessor 130 generates PWM signal 181A which is filtered by a plurality of low-pass filters ("LO-PASS FILTERS-A") 298A to produce an analog DC voltage 300 to control VCTCXO 270. For an RCCE operating as an MU, PWM signal 181A is set to 50 percent duty cycle to achieve a stable fixed nominal value for 76 MHz signal 288.

PWM signal 181B generated by microprocessor 130 is filtered by the plurality of low-pass filters ("LO-PASS FILTERS-B") 298B to produce the DC analog PWR CTRL signal 199 which controls the power output level in Radiofrequency Section 170.

The SIG LEVELS signals 200 input to subsection 276 are logarithmic representations of instantaneous power levels received by Radiofrequency Section 170. SIG LEVELS signals 200 are filtered by a plurality of low-pass filters 304 (not shown) in a filter assembly ("FILTERS, SAMPLE, HOLD, RESET") 306, the filters 304 having relatively long time-constants producing a plurality of filtered slow response RSSI signals ("SLOW RSSI") 308S. Signals 200 are also filtered by a plurality of low-pass filters 310 (not shown) in filter assembly 306, the filters 310 having relatively short time-constants about one-fourth of the duration of a single chip search period. Signals 200 are also periodically clamped to the SLOW RSSI signal levels 308S by A-CTRL signal 193 to produce a plurality of filtered fast response RSSI signals ("FAST RSSI") 308F. The FAST RSSI signals 308F are compared with the SLOW RSSI signals 308S in a plurality of thresholding circuits ("THRESHOLD CIRCUITS") 314 to produce the DIG-SIGS signals 194 which indicate when the FAST RSSI signal levels exceed the SLOW RSSI signal levels by a predetermined margin. Signals 194 indicate that the chip position of a particular search in progress is the probable phase for correlation between the received PRDS code and the test PRDS code. Analog levels of the SLOW RSSI signals 308 are measured as the A/D signals 182 by microprocessor 130, and are used in evaluating correlation power for transmit power control.

Analog Section 160 is implemented in discrete circuit components including IC amplifiers, IC analog gates, IC comparators, hybrid circuit assemblies, and discrete resistors, capacitors and inductors. Preferably, VCTCXO 270 is a miniature hybrid module manufactured by TEW Corporation of Norcross, Ga. which generates a 14.4000 MHz clock frequency with a nominal stability of ±2.5 parts-per-million (ppm), and has a voltage control range which allows the frequency to be varied a minimum of ±8 ppm.

6. Radiofrequency Section

Figure 11:
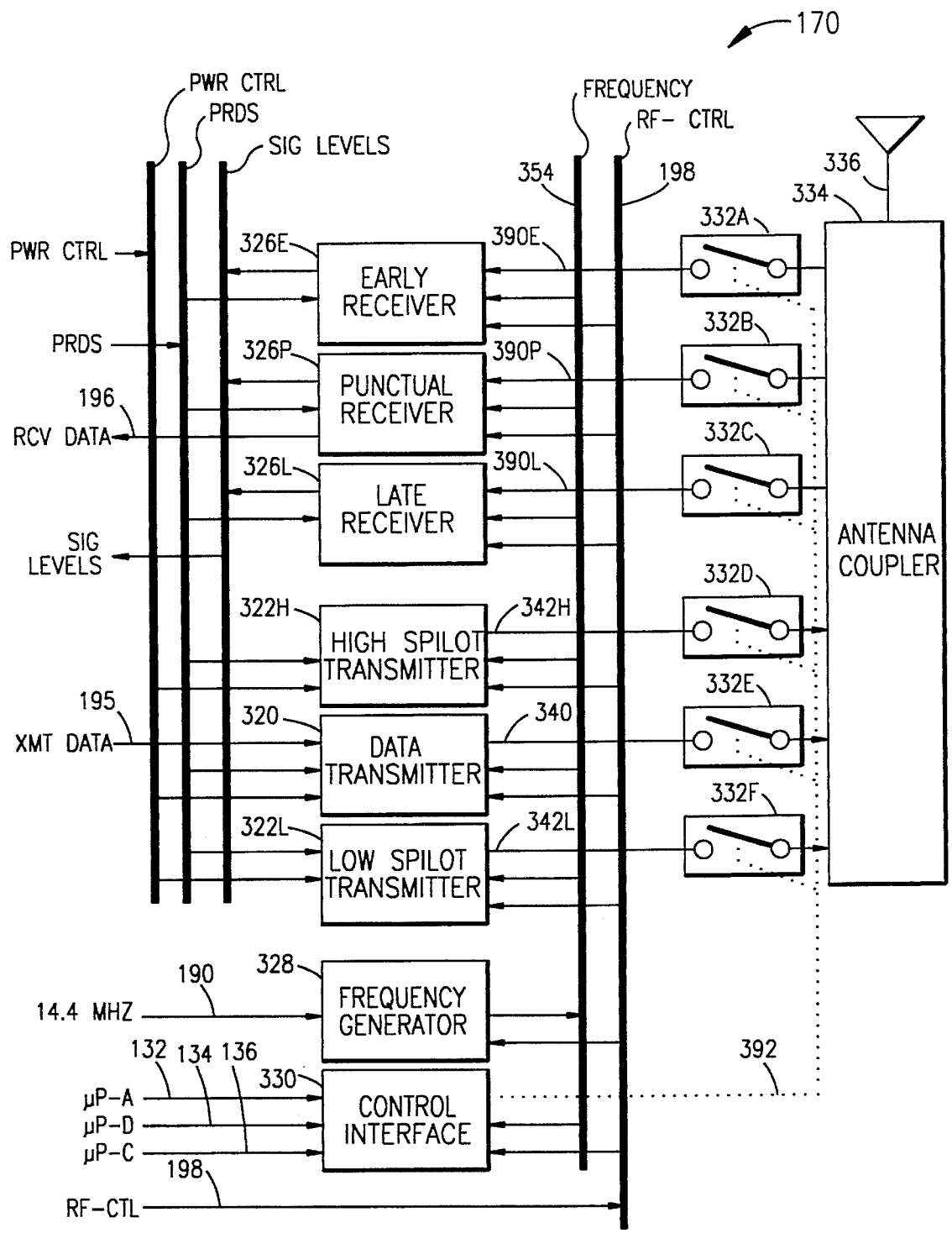
FIG. 11 is a block diagram of the FIG. 8 Radiofrequency Section, including a Main signal transmitter, two spilot transmitters, three receivers, a frequency generator, a control interface, six selector switches, an antenna coupler, and an antenna.

Referring to FIG. 11, the Radiofrequency Section 170 includes: a Main signal transmitter ("DATA TRANSMITTER") 320; a Low Spilot transmitter ("LOW SPILOT TRANSMITTER") 322L and a High Spilot transmitter ("HIGH SPILOT TRANSMITTER") 322H, identical except for their spread spectrum signal center frequency and output BPF center frequency; an Early RF receiver ("EARLY RECEIVER") 326E, a Punctual RF receiver ("PUNCTUAL RECEIVER") 326P, and a Late RF receiver ("LATE RECEIVER") 326L having identical circuitry; a frequency generator ("FREQUENCY GENERATOR") 328; a control interface ("CONTROL INTERFACE") 330; six input/output selector switches 332A, 332B, 332C, 332D, 332E, 332F; an antenna coupler ("ANTENNA COUPLER") 334; and an antenna 336.

CONTROL INTERFACE 330 interfaces with other sections of RCCE 16 via memory address bus 132, memory data bus 134, and memory control bus 136, and provides a plurality of registers 330R (not shown) for local control of Radiofrequency Section 170 via microprocessor 130. Registers 130R hold programmable parameter values for receivers 326E, 326P, 326L, for transmitters 320, 322H, 322L, and for frequency generator 328.

Figure 12:
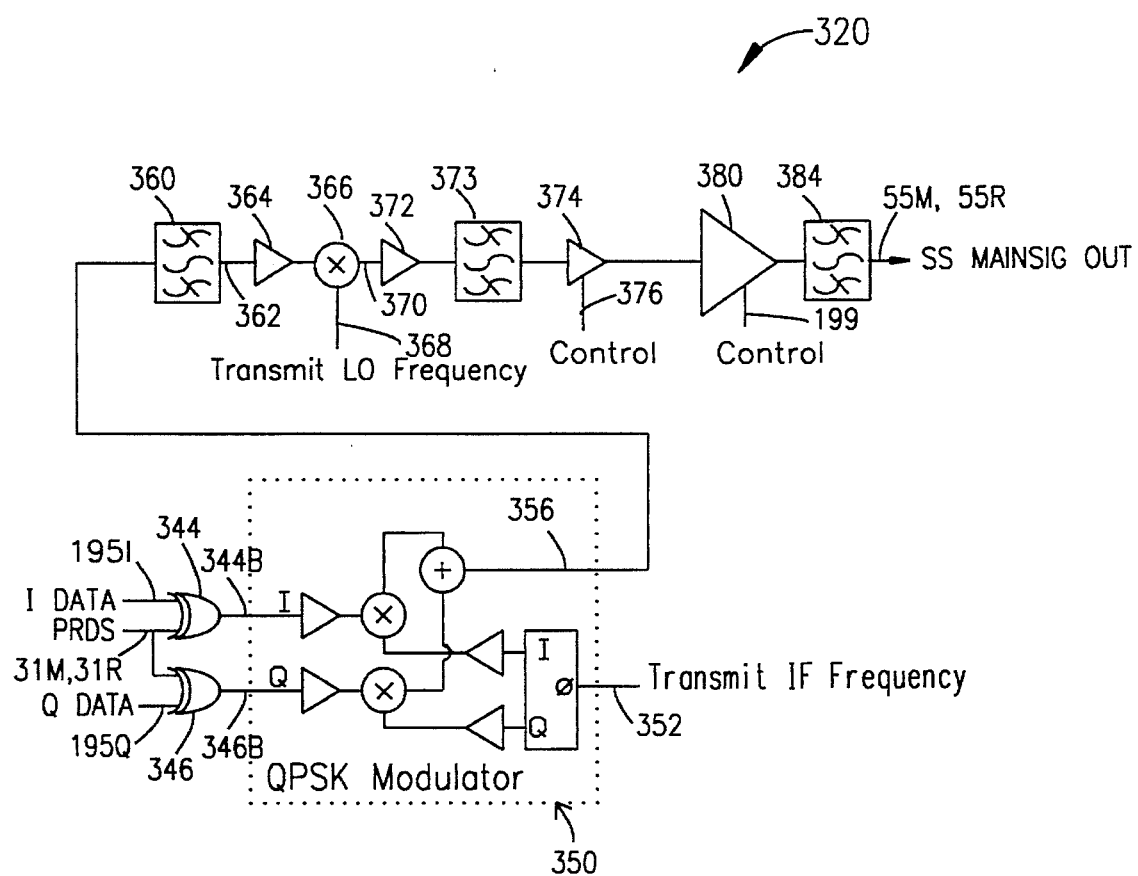
FIG. 12 is a block diagram of the FIG. 11 Main signal transmitter.

Referring to FIGS. 11 and 12, DATA TRANSMITTER 320 provides via a line 340 the QPSK-modulated spread spectrum Main signal 55M, 55R for MU and RU transmissions, respectively, centered at 2,442.00 MHz. LOW SPILOT TRANSMITTER 322L and HIGH SPILOT TRANSMITTER 322H provide, respectively, a QPSK-modulated spread spectrum spilot signal 342L, 342H, centered, respectively, at 2,404.000 MHz and 2,480.000 MHz.

Two bits of data, an in-phase data bit ("I DATA") 195I and a quadrature data bit ("Q DATA") 195Q are sent in each symbol time (1.6842 μsec) via XMIT DATA line 195 from COM DATA CONTROL 216 to DATA TRANSMITTER 320. Each data bit is spread in an exclusive-OR gate 344, 346, respectively, by the appropriate M-code PRDS 31M or R-Code PRDS 31R, and presented as baseband spread signals 344B, 346B, respectively, to a QPSK modulator 350. The modulator 350 combines the signals 344B, 346B with a 400.00 MHz local transmit IF frequency 352 from a frequency bus 354, modulating an in-phase and quadrature phase of the local transmit IF frequency, and summing the two modulated signals to form a QPSK-modulated spread spectrum signal 356. Signal 356 is passed through a first 76 kHz-wide BPF 360 centered at 400 MHz, thus eliminating out-of-band components in a filtered signal 362. Signal 362 is amplified in an amplifier 364, and then mixed in a mixer 366 with a 2,042.00 MHz transmit local oscillator (LO) frequency 368 to produce a spread spectrum RF signal 370 centered at 2,442.00 MHz and having a 76 MHz bandwidth main lobe between first nulls. Signal 370 is then passed through a buffer amplifier 372 and a second BPF 373 to remove out-of-band signals, before being passed through a linear amplifier 374 which provides initial amplification. A control line 376 provides ON/OFF transmitter control for transmit/receive operation. Output of amplifier 374 is boosted by a power amplifier 380, with control signal 199 setting the power level. Before the Main signal is transmitted, a third BPF 384 removes any out-of-band signals produced by non-linearities in amplifier 380.

Figure 13:
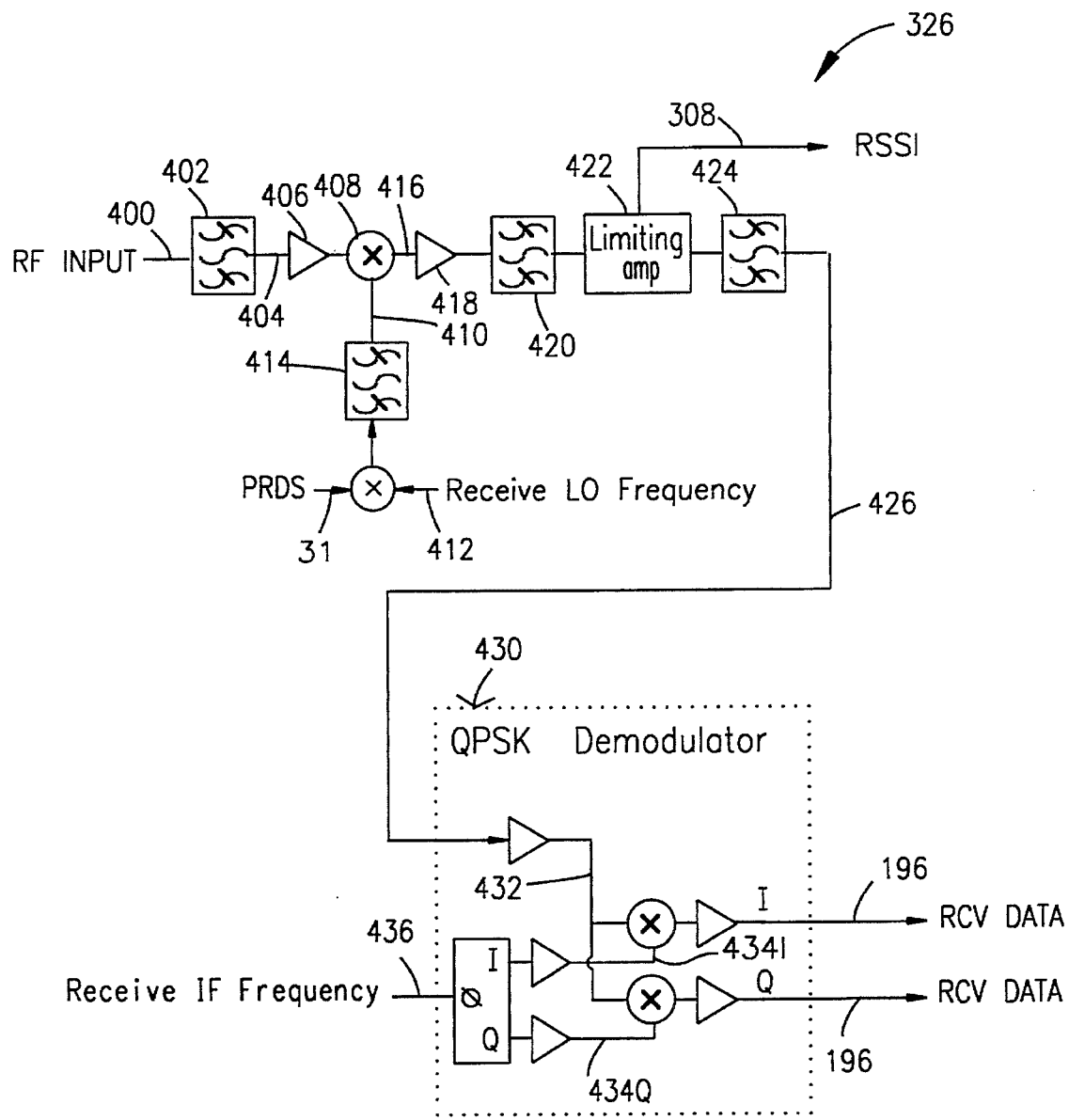
FIG. 13 is a block diagram common to the three FIG. 11 receivers.

Referring to FIGS. 11 and 13, EARLY RECEIVER 326E and LATE RECEIVER 326L are used for tracking during searches by testing for correlation each phase tested by PUNCTUAL RECEIVER 326P one-quarter clock-chip earlier and one-quarter clock-chip later, respectively, concurrent with and relative to phase testing by receiver 326P. Once correlation is achieved, PUNCTUAL RECEIVER 326P is used for data reception. Receivers 326E, 326L, 326P have identical circuitry and receive, when active, identical signals 390E, 390L, 390P, respectively. Whenever DATA TRANSMITTER 320 is operating, receivers 326E, 326L, 326P are disabled, and their inputs are switched off via selector switches 332A, 332C, 332B, respectively, to prevent overloading which could lengthen recovery time until they could again receive data, or cause permanent damage. Switches 332A, 332B, 332C are controlled by a plurality of signals 392 from CONTROL INTERFACE 330. Similarly, whenever receivers 326E, 326L, 326P are operating, transmitters 340, 342H and 342L are disabled, and their inputs are switched off via selector switches 332E, 332D, 332F, respectively. Switches 332D, 332E, 332F are controlled by signals 392. Table 5 shows how switches 332A, 332B, 332C, 332D, 332E, 332F are controlled by signals 392 to be ON or OFF depending upon RCCE configuration and mode.

Each switch 332A–332F allows switching different signals into and out of antenna coupler 334 and thereby to RF antenna 336. Antenna coupler 334 is implemented with a plurality of passive elements 334E (not shown) which provide isolation between switches 332A–332F while connecting each switch to antenna 336 via a low loss path.

Referring to FIG. 13, a DSSS RF signal 400 detected by antenna 336 is band-limited by a passband filter 402 passing a signal 404 in a frequency range 2402 MHz to 2482 MHz. When the RCCE is configured as an RU, filter 402 passes the desired spectra of the Main signal and the Low Spilot and High Spilot signals. When the RCCE is configured as an MU, the passband of filter 402 is reduced to allow passage of only the Main signal while attenuating the Low Spilot and High Spilot signals. Signal 404 is buffered by a low noise amplifier 406 which sets the receiver noise figure and provides signal amplification. Amplifier 406 also provides a fixed impedance to a double-balanced mixer 408. Mixer 408 multiplies the input spectra by a spread receive LO signal 410 generated by multiplying a continuous-wave receive LO signal 412 by the appropriate PRDS, 31M, 31R, or 31P, and filtering the desired spectral components by a band pass filter 414, resulting in a signal 416. Depending upon the desired signal to be received, Main signal, Low Spilot or High Spilot, the PRDS code and code rate, and the receiver local oscillator frequency will differ. Signal 416 is thus the product of the received signal and the spread receiver local oscillator frequency 410, and represents the down-converted and correlated received IF signal. Signal 416 is buffered by an amplifier 418 and passed sequentially through a narrow-band bandpass filter 420 and a multistage limiting amplifier 422. The bandpass of filter 420 differs depending upon whether the Main signal or one of the spilot signals is being received. Amplifier 422 generates most of the receiver gain and produces the logarithmic RSSI 308, the value of which indicates the power of the received signal level. After additional IF filtering in a bandpass filter 424, an IF signal 426 is passed to a QPSK demodulator 430. A buffered IF signal 432 is multiplied by an in-phase element 434I and a quadrature element 434Q of a coherent receiver IF frequency 436. The resulting analog outputs are the in-phase and quadrature components of RCV DATA 196.

Figure 14:
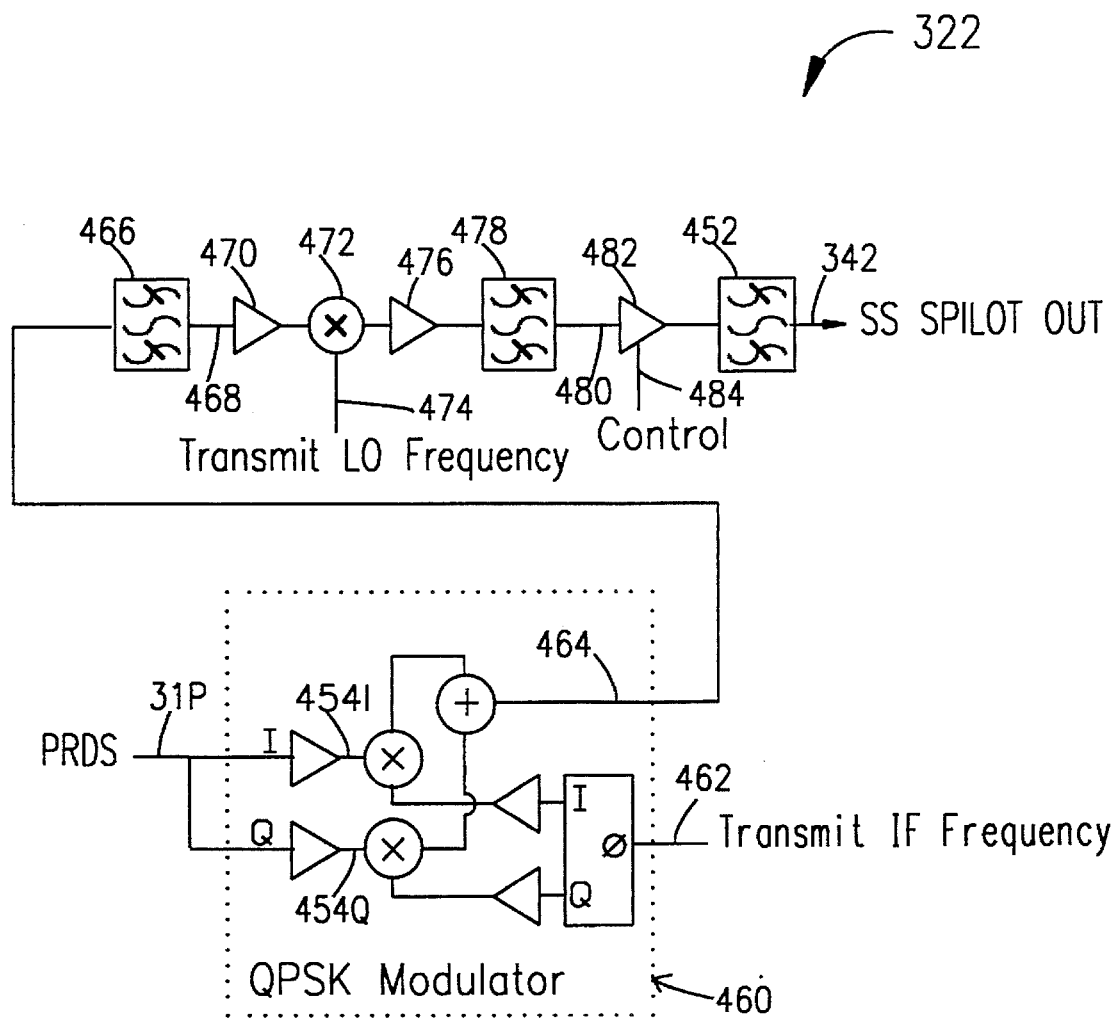
FIG. 14 is a block diagram common to the two FIG. 11 spilot transmitters.

Referring to FIGS. 11 and 14, HIGH SPILOT TRANSMITTER 322H and LOW SPILOT TRANSMITTER 322L are identical except for the center frequency of DSSS output signal 342H, 342L, respectively, the center frequencies of their BPF's 466, 478 and 452, and their transmit IF frequencies 462. No data are modulated onto signals 342H, 342L, so an in-phase component 454I and a quadrature component 454Q of PRDS code 31P input to a QPSK modulator 460 are identical. A transmit IF frequency signal 462 is mixed in modulator 460 with components 454I and 454Q and then summed to produce a spread IF signal 464. Signal 464 is filtered in a BPF 466 having a 2.50 MHz bandwidth, resulting in a filtered signal 468. Signal 468, after being amplified by an amplifier 470, is mixed in a mixer 472 with a transmit LO frequency 474, and further amplified in an amplifier 476 before passing through a second BPF 478, resulting in a signal 480. Signal 480 is amplified by a power amplifier 482 controlled by an OFF/ON control 484, and filtered for out-of-band signals in BPF 452, before being transmitted as spilot signal 342.

Referring to FIGS. 11, 12, 13, 14, FREQUENCY GENERATOR 328 includes a plurality of PLL's 328P (not shown), a plurality of VCO's 328V (not shown), and a plurality of counters/dividers 328C (not shown) to generate RF reference frequencies required by Radiofrequency Section 170. All frequencies generated are distributed on the frequency bus 354 and are phase-locked to the incoming 14.4 MHz signal 190. Reference frequencies on bus 354 include: 200.00 MHz used for LOW SPILOT receive IF 436L, HIGH SPILOT receive IF 436H, and Mainsig receive IF 436M (shown generically as frequency 436 in FIG. 13); 362.00 MHz used for LOW SPILOT transmit IF 462L (shown generically as frequency 462 in FIG. 14); 400.00 MHz used for Mainsig transmit IF 352; 438.00 MHz used for HIGH SPILOT transmit IF 462H (shown generically as frequency 462 in FIG. 14; 2,042.00 MHz used for Mainsig transmit LO 368, and HIGH SPILOT and LOW SPILOT transmit LO's 474H, 474L, respectively (shown generically as transmit LO 474 in FIG. 14); 2,204.00 MHz used for LOW SPILOT receive LO 412L (shown generically as receive LO 412 in FIG. 13); 2,280.00 MHz used for HIGH SPILOT receive LO 412H (shown generically as receive LO 412 in FIG. 13); and 2,242.00 MHz used for Mainsig receive LO 412M (shown generically as receive LO 412 in FIG. 13).

TABLE 1

| Item (*=calculated value) | Value |
| --- | --- |
| Chip clock (MHz) | 38.000 |
| Chip distance equivalent (m) | 7.895* |
| Code length (chips) | 32,768 |
| Code time (μsec) | 862.316* |
| Bits per sec per baud | 2 |
| Bit rate (Mbps) | 1.188* |
| Baud rate (kbaud) | 593.75* |
| IF bandwidth (kHz) | 650.000 |
| Process gain (dB) | 20.679* |
| Data bit time (μsec) | 0.842* |
| Data byte time (μsec) | 6.737* |
| Data bytes per code length | 128 |
| Chip search time (μsec) | 26.947* |
| Data bytes per chip search time | 4 |
| Search distance (m) | 375* |
| Total search chips | 95* |
| Transaction cycle time (msec) | 101.861 |
| Maximum Data Throughput (Mbps) | 1.005* |
| Spilot code length | 1,024 |
| Spilot chip rate (MHz) | 1.188* |
| Spilot processing gain (dB) | 30.0 |
| Spilot IF bandwidth (kHz) | 2.375* |

TABLE 2

| Spectra Feature | Mainsig Freq (MHz) | Ampl (dB) | Low Spilot Freq (MHz) | Ampl (dB) | High Spilot Freq (MHz) | Ampl (dB) |
| --- | --- | --- | --- | --- | --- | --- |
| 4th lower null | 2,290.000 | | 2,399.250 | | 2,475.250 | |
| 3rd lower sidelobe peak | 2,310.026 | −20.8 | 2,399.876 | −20.8 | 2,475.876 | −20.8 |
| 3rd lower null | 2,328.000 | | 2,400.438 | | 2,476.438 | |
| 2nd lower sidelobe peak | 2,348.520 | −17.8 | 2,401.079 | −17.8 | 2,477.079 | −17.8 |
| 2nd lower null | 2,366.000 | | 2,401.625 | | 2,477.625 | |
| 1st lower sidelobe peak | 2,387.622 | −13.3 | 2,402.301 | −13.3 | 2,478.301 | −13.3 |
| 1st lower null | 2,404.000 | | 2,402.813 | | 2,478.813 | |
| main lobe peak | 2,442.000 | 0.0 | 2,404.000 | 0.0 | 2,480.000 | 0.0 |
| 1st upper null | 2,480.000 | | 2,405.188 | | 2,481.188 | |
| 1st upper sidelobe peak | 2,496.378 | −13.3 | 2,405.699 | −13.3 | 2,481.699 | −13.3 |
| 2nd upper null | 2,518.000 | | 2,406.375 | | 2,482.375 | |
| 2nd upper sidelobe peak | 2,535.480 | −17.8 | 2,406.921 | −17.8 | 2,482.921 | −17.8 |
| 3rd upper null | 2,556.000 | | 2,407.563 | | 2,483.563 | |
| 3rd upper sidelobe peak | 2,573.974 | −20.8 | 2,408.124 | −20.8 | 2,484.124 | −20.8 |
| 4th upper null | 2,594.000 | | 2,408.750 | | 2,484.750 | |

TABLE 3

| Subpacket (Sbpkt) | XMIT Unit | RCV Unit | Search Chips | Bytes | Description (number of bytes if more than one) |
|---|---|---|---|---|---|
| THD Transaction header | MU | RU, RUI, RUR | | 13 | Sync (4), Sbpkt ID, Acknowledge status (3), RUI addr, RUR addr, CRC (2), Quiet |
| LCSI Long chip search (from RUI) | RUI | MU, RUR | 95 | 386 | Zeros (380), REQ ID. RUI addr, RUR addr. CRC (2), Quiet |
| LCSR Long chip search (from RUR) | RUR | MU, RUI | 95 | 386 | Zeroes (381), RSA ID, RUR addr, CRC (2), Quiet |
| SCS Short chip search | RUI or RUR | MU or RUR or RUI | 5 | 26 | Zeroes (20), SCS ID, RUI addr, RUR addr, CRC (2), Quiet |
| DAT Data | RUI | RUR, MU | | 10 minimum. 1610 maximum | Sync (4), Control, Data length (2), Data (0 to 1600), CRC (2), Quiet |
| RSD RUR data status | RUR | MU, RUI | | 9 | Sync (4), RUR addr, Acknowledge code, CRC (2), Quiet |

TABLE 4

| | Quantity per | Sbpkt 1 | | Sbpkt 2 | | Sbpkt 3 | | TOTAL | |
|---|---|---|---|---|---|---|---|---|---|
| Transaction (TRAN) | TRAN cycle | Type | Bytes | Type | Bytes | Type | Bytes | Bytes | Time (msec) |
| LRQT Long Request | 2 | THD | 13 | LCSI | 386 | | | 399 | 2.688 |
| LRST Long RUR Synchronization | 2 | THD | 13 | LCSR | 386 | | | 399 | 2.699 |
| SRQT Short Request | 6 | THD | 13 | SCS | 26 | | | 39 | 0.263 |
| SRST Short RUR Synchronization | 6 | THD | 13 | SCS | 26 | | | 39 | 0.263 |
| DAAT Data and Acknowledge | 8 | THD | 13 | DAT | 1610 | RSD | 9 | 1632 | 10.995 |

TABLE 5

| RCCE | | Switch | | | | | |
|---|---|---|---|---|---|---|---|
| Config | Mode | 332A | 332B | 332C | 332D | 332E | 332F |
| MU | XMT | OFF | OFF | OFF | ON | ON | ON |
| MU | RCV | OFF | ON | OFF | ON | OFF | ON |
| RU | XMT | OFF | OFF | OFF | OFF | ON | OFF |
| RU | RCV | ON | ON | ON | OFF | OFF | OFF |

What is claimed is:

1. A method of direct-sequence spread spectrum (DSSS) digital communication between a transmitter and a receiver within a frequency band including a predetermined lower limit frequency, a predetermined center frequency, and a predetermined upper limit frequency, said method at the transmitter comprising the steps of:

generating continuously and repetitively at a predetermined chip-clock rate about one-half of the predetermined frequency bandwidth, a pseudorandom digital sequence (PRDS) code comprising a multiplicity of bits and having a bit sequence length equal to the product of a first integer and a second integer, each complete sequence of the code generated over a predetermined time interval;

intermittently modulating onto the PRDS code, in accordance with protocol for repetitively determining whether, when, and over what duration the transmitter may transmit, the protocol common to the transmitter and the receiver, a plurality of data signals, each signal comprising a plurality of digital symbols, wherein the number of chips encoding a symbol is a third integer, the number of bits included in a symbol is a fourth integer, and the number of bits included in a digital byte is a fifth integer;

intermittently transmitting the data-modulated PRDS code, each transmission of a code segment beginning at a time determined by the protocol and initialized at a preselected and identifiable bit position in the PRDS code, the bit position selected from among the multiplicity of bits comprising the code, each transmission comprising a predetermined number of data bytes and terminating at a time determined by the protocol, each transmission beginning and ending at a position in the PRDS code coinciding with one of a multiplicity of symbol boundaries;

transmitting each transmission of the data-modulated PRDS code at a signal center frequency about equal to the center frequency of the frequency band;

said method at the receiver comprising the steps of:

generating continuously and repetitively, at the chip-clock rate of the transmitter PRDS code, a PRDS code identical to the transmitter PRDS code, each complete sequence of the receiver-generated code generated over said predetermined time interval;

receiving from the transmitter, when the transmitter is transmitting, the data-modulated PRDS code;

synchronizing a bit sequence in the receiver-generated PRDS code with a corresponding bit sequence in the transmitter PRDS code segment;

demodulating the data signals modulated onto the received code segment.

2. The method of claim 1, said method at the transmitter further comprising the steps of:

generating continuously and repetitively, at a second predetermined chip-clock rate evenly divisible into said chip-clock rate by a factor which is a sixth integer, a second PRDS code having a bit sequence length equal to a seventh integer, each complete sequence of the second PRDS code generated over said predetermined time interval;

code-locking the second PRDS code to said PRDS code so that each successive chip of the second PRDS code has a predetermined one-to-one correspondence with a chip which is the leading chip of the chips comprising successive bits of said PRDS code, successive chips of the second PRDS code corresponding to said chips of said PRDS code separated by a number of chips equal to said sixth integer;

phase-locking the second PRDS code to said PRDS code so that a preselected and identifiable bit position in the second PRDS code aligns with said preselected bit position of said PRDS code;

transmitting continuously the second PRDS code at a signal center frequency near at least one limit frequency of the frequency band;

said method at the receiver further comprising the steps of:

receiving continuously from the transmitter the second PRDS code;

synchronizing a bit sequence in the transmitter second PRDS code with a corresponding bit sequence in said receiver-generated PRDS code.

3. The method of claim 2, wherein:

the lower limit frequency of the frequency band is about 2,400.000 MHz;

a first center frequency of the transmitter second PRDS code signal is about 2,404.000 MHz;

the center frequency of the frequency band and the center frequency of said transmitter PRDS code signal are each about 2,442.000 MHz;

a second center frequency of the transmitter second PRDS code signal is about 2,480.000 MHz; the upper limit frequency of the frequency band is about 2,483.500 MHz;

said sixth integer is a first integer power of 2; and said seventh integer is a second integer power of 2.

4. The method of claim 3, wherein:

said first integer power of 2 is $2^5=32$; and said second integer power of 2 is $2^{10}=1024$.

5. The method of claim 1, wherein:

the lower limit frequency of the frequency band is about 2,400.000 MHz;

the center frequency of the frequency band and the center frequency of said transmitter PRDS code signal are each about 2,442.000 MHz;

the upper limit frequency of the frequency band is about 2,483.500 MHz;

said first integer is 1;

said second integer is a first integer power of 2;

said third integer is a second integer power of 2;

said fourth integer is a third integer power of 2; and said fifth integer is a fourth integer power of 2.

6. The method of claim 5, wherein:

said first integer power of 2 is $2^{15}=32,768$;

said second integer power of 2 is $2^6=64$;

said third integer power of 2 is $2^1=2$; and said fourth integer power of 2 is $2^3=8$.

7. The method of claim 1, wherein each of said multiplicity of symbol boundaries coincides with a byte boundary.

8. The method of claim 1, wherein quadriphase shift keying (QPSK) is used to modulate said plurality of data signals onto the transmitter PRDS code.

9. A method of DSSS time-division multiple access (TDMA) digital communication between a first transceiver comprising a first transmitter and a first receiver and a second transceiver comprising a second transmitter and a second receiver, within a frequency band including a predetermined lower limit frequency, a predetermined center frequency, and a predetermined upper limit frequency, said method at the first transmitter comprising the steps of:

generating continuously and repetitively at a predetermined chip-clock rate about one-half of the predetermined frequency bandwidth, a first PRDS code comprising a first multiplicity of bits and having a bit sequence length equal to the product of a first integer and a second integer, each complete sequence of the first code generated over a predetermined time interval;

intermittently modulating onto the first PRDS code, in accordance with a protocol for repetitively determining whether, when, and over what duration the first transmitter or the second transmitter may transmit, the protocol common to the first transmitter, second receiver second transmitter, and first receiver, a plurality of data signals, each signal comprising a plurality of digital symbols, wherein the number of chips encoding a symbol is a third integer, the number of bits included in a symbol is a fourth integer, and the number of bits included in a digital byte is a fifth integer;

intermittently transmitting the data-modulated first PRDS code, each transmission of a code segment beginning at a time determined by the protocol and initialized at a preselected and identifiable bit position in the first PRDS code, the bit position selected from among the multiplicity of bits comprising the code, each transmission comprising a predetermined number of symbols and terminating at a time determined by the protocol, each transmission beginning and ending at a position in the first PRDS code coinciding with one of a multiplicity of symbol boundaries;

transmitting each transmission of the data-modulated first PRDS code at a signal center frequency about equal to the center frequency of the frequency band;

said method at the second receiver comprising the steps of:

generating continuously and repetitively, at the chip-clock rate of the first transmitter first PRDS code, a PRDS code identical to the first transmitter first PRDS code, each complete sequence of the receiver-generated code generated over said predetermined time interval;

receiving from the first transmitter, when the first transmiter is transmitting, the data-modulated first PRDS code;

synchronizing a bit sequence in the receiver-generated PRDS code with a corresponding bit sequence in the first transmitter first PRDS code segment;

demodulating the data signals modulated onto the received code segment;

said method at the second transmitter comprising the steps of:

generating continuously and repetitively at said predetermined chip-clock rate, a second PRDS code having a sequence length equal to the product of said first integer and said second integer, each complete sequence of the second code generated over said predetermined time interval;

intermittently modulating onto the second PRDS code, in accordance with the protocol, a plurality of data signals, each signal comprising a plurality of digital symbols, wherein the number of chips encoding a symbol is said third integer, the number of bits included in a symbol is said fourth integer, and the number of bits included in a digital byte is said fifth integer;

intermittently transmitting the data-modulated second PRDS code, each transmission of a code segment beginning at a time determined by the protocol and initialized at a preselected and identifiable bit position in the second PRDS code, the bit position selected from among the multiplicity of bits comprising the code, each transmission comprising a predetermined number of data bytes and terminating at a time determined by the protocol, each transmission beginning and ending at a position in the second PRDS code coinciding with one of a multiplicity of symbol boundaries;

transmitting each transmission of the data-modulated second PRDS code at a signal center frequency about equal to the center frequency of the frequency band;

said method at the first receiver comprising the steps of:

generating continuously and repetitively at said chip-clock rate a PRDS code identical to the second PRDS code generated by the second transmitter, each complete sequence of the receiver-generated code generated over said predetermined time interval;

receiving from the second transmitter, when the second transmitter is transmitting, the data-modulated second PRDS code;

synchronizing a bit sequence in the receiver-generated PRDS code with a corresponding bit sequence in the second transmitter PRDS code segment;

demodulating the data signals modulated onto the received code segment.

10. The method of claim 9, said method at the first transmitter further comprising the step of:

initializing each data-modulated first PRDS code segment transmitted with a constant preselected phase reference;

said method at the second receiver further comprising the steps of:

detecting and determining the preselected phase reference of the received PRDS code segment;

synchronizing the receiver-generated first PRDS code with the preselected phase reference;

said method at the second transmitter further comprising the step of:

initializing each data-modulated second PRDS code segment transmitted with the preselected phase reference;

said method at the first receiver further comprising the steps of:

detecting and determining the preselected phase reference of the received PRDS code segment;

synchronizing the receiver-generated second PRDS code with the preselected phase reference.

11. The method of claim 9, wherein the first and second PRDS codes are identical.

12. The method of claim 9, said method at the first transmitter further comprising the steps of:

generating continuously and repetitively, at a second predetermined chip-clock rate evenly divisible into said chip-clock rate by a factor which is a sixth integer, a third PRDS code having a sequence length equal to a seventh integer, each complete sequence of the third PRDS code generated over said predetermined time interval;

code-locking the third PRDS code to the first PRDS code so that each successive chip of the third PRDS code has a predetermined one-to-one correspondence with a chip which is the leading chip of the chips comprising successive bits of the first PRDS code, successive chips of the third PRDS code corresponding to said chips of the first PRDS code separated by a number of chips equal to said sixth integer;

phase-locking the third PRDS code to the first PRDS code so that a preselected and identifiable bit position in the third PRDS code aligns with said preselected and identifiable bit position in the first PRDS code;

transmitting continuously the third PRDS code at a signal center frequency near at least one limit frequency of the frequency band;

said method at the second receiver further comprising the steps of:

receiving continuously from the first transmitter the third PRDS code;

synchronizing a bit sequence in the received third PRDS code with a corresponding bit sequence in the receiver-generated first PRDS code.

13. The method of claim 12, wherein said preselected and identifiable position in the first PRDS code is the "all-one's" (ALL1S) position, and said preselected and identifiable position in the third PRDS code is the ALL1S position.

14. The method of claim 12, wherein:

the lower limit frequency of the frequency band is about 2,400.000 MHz;

a first center frequency of the third PRDS code signal transmitted by the first transmitter is about 2,404.000 MHz;

the center frequency of the frequency band and the center frequency of said first and second PRDS code signals transmitted, respectively, by the first and second transmitters are each about 2,442.000 MHz;

a second center frequency of the third PRDS code signal transmitted by the first transmitter is about 2,480.000 MHz;

the upper limit frequency of the frequency band is about 2,483.500 MHz;

said sixth integer is a first integer power of 2; and said seventh integer is a second integer power of 2.

15. The method of claim 14, wherein:

said first integer power of 2 is $2^5=32$; and said second integer power of 2 is $2^{10}=1024$.

16. The method of claim 9, wherein:

the lower limit frequency of the frequency band is about 2,400.000 MHz;

the center frequency of the frequency band and the center frequency of said first and second transmitter PRDS code signals are each about 2,442.000 MHz;

the upper limit frequency of the frequency band is about 2,483.500 MHz;

said first integer is 1;

said second integer is a first integer power of 2;

said third integer is a second integer power of 2;

said fourth integer is a third integer power of 2; and said fifth integer is a fourth integer power of 2.

17. The method of claim 16, wherein:

said first integer power of 2 is $2^{15}=32,768$;

said second integer power of 2 is $2^6=64$;

said third integer power of 2 is $2^1=2$; and said fourth integer power of 2 is $2^3=8$.

18. A method of DSSS TDMA digital communication within a network via a communication medium, the network comprising a Master Unit (MU) transceiver comprising a transmitter and a receiver, and a plurality of Remote Unit (RU) transceivers identical to the MU transceiver, said method comprising executing a plurality of sequential communication transactions, each transaction comprising transmitting, using a first PRDS code, a first type of subpacket from the MU to at least one RU;

receiving at the RU(s) the subpacket transmitted from the MU;

transmitting, using a second PRDS code, at least one subpacket from at least one RU;

receiving at the MU and at least one RU each subpacket transmitted from an RU.

19. The method of claim 18, wherein each said transaction is selected from a first plurality of transaction types, each transaction type consisting of a predetermined sequence of subpackets beginning with a subpacket of said first type, each additional subpacket selected from a second plurality of subpacket types, each subpacket type consisting of a predetermined sequence of block elements, each block element consisting of a predetermined number of bytes.

20. The method of claim 19, wherein:

each transaction is selected from the group consisting of a first transaction type, a second transaction type, a third transaction type, a fourth transaction type, and a fifth transaction type; and each said additional subpacket is selected from the group consisting of a second subpacket type, a third subpacket type, a fourth subpacket type, a fifth subpacket type, and a sixth subpacket type.

21. The method of claim 20, wherein:

executing a transaction of the first type enables all RU receivers in the network to synchronize to the first PRDS code transmitted by the MU in a subpacket of the first type, and enables the MU and a first RU, selected as a Remote Unit Recipient (RURI by a second RU requesting permission to become a Remote Unit Initiator (RUI) by transmitting a subpacket of the second type, to synchronize to the second PRDS code transmitted by the second RU, when maximum separations between the MU and second RU and between the first RU and second RU are each less than a predetermined distance;

executing a transaction of the second type enables RU receivers to synchronize to the first PRDS code transmitted by the MU in a subpacket of the first type, and enables the MU and RUI to synchronize to the second PRDS code transmitted by the RUR in a subpacket of the third type, when maximum separations between the MU and RUR and between the RUI and RUR are each less than said predetermined distance;

executing a transaction of the third type enables RU receivers to synchronize to the first PRDS code transmitted by the MU in a subpacket of the first type, and enables the MU and RUI to resynchronize to the second PRDS code transmitted by the RUR in a subpacket of the fourth type;

executing a transaction of the fourth type enables RU receivers to synchronize to the first PRDS code transmitted by the MU in a subpacket of the first type, and enables the MU and RUR to resynchronize to the second PRDS code transmitted by the RUI in a subpacket of the fourth type; and executing a transaction of the fifth type enables the RUI and RUR to synchronize to the first PRDS code transmitted by the MU in a subpacket of the first type, enables the RUR to receive data transmitted by the RUI in a subpacket of the fifth type, and enables the MU and RUI to receive a message acknowledging data receipt transmitted by the RUR in a subpacket of the sixth type.

22. The method of claim 21, wherein each subpacket of the first type consists of seven sequential digital blocks, a first block consisting of four bytes and enabling all RU receivers in the network to synchronize to the first PRDS code transmitted by the MU, a second block consisting of one byte and identifying a message type from among a predetermined number of message, a third block consisting of three bytes and acknowledging status of a selected RU, a fourth block consisting of one byte and identifying an RU as an RUI, a fifth block consisting of one byte and identifying an RU as an RUR, a sixth block consisting of two bytes and providing a cyclic redundant check, and a seventh block consisting of one byte and providing a quiet interval between said subpacket and an immediately following subpacket.

23. The method of claim 22, wherein each subpacket of the first type is initialized with a common zero phase reference.

24. The method of claim 21, wherein the first transaction type comprises a second subpacket transmitted by an RU requesting permission to become an RUI, said subpacket consisting of six sequential digital blocks, a first block consisting of a 380-byte sequence of digital zeroes and enabling the MU and all RU receivers in the network to synchronize to the RU-transmitted second PRDS code, a second block consisting of one byte and enabling the RU to request permission to become an RUI, a third block consisting of one byte and identifying the requesting RU, a fourth block consisting of one byte and identifying an RU selected by the requesting RU to become an RUR, a fifth block consisting of two bytes and providing a cyclic redundant check, and a sixth block consisting of one byte and providing a quiet interval between said subpacket and an immediately following subpacket.

25. The method of claim 21, wherein the second transaction type comprises a second subpacket transmitted by the RUR, said subpacket consisting of five sequential digital blocks, a first block consisting of a 381-byte sequence of digital zeroes and enabling the MU and RUI to synchronize to the RUR-transmitted second PRDS code, a second block consisting of one byte and reporting to the MU and RUI that synchronization to the RUI was achieved, a third block consisting of one byte and identifying the RUR, a fourth block consisting of two bytes and providing a cyclic redundant check, and a fifth block consisting of one byte and providing a quiet interval between said subpacket and an immediately following subpacket.

26. The method of claim 21, wherein the third transaction type comprises a second subpacket transmitted by the RUR, said subpacket consisting of six sequential digital blocks, a first block consisting of a 20-byte sequence of digital zeroes and enabling the MU and RUI to resynchronize to the RUR-transmitted second PRDS code, a second block consisting of one byte and identifying a resynchronization subpacket, a third block consisting of one byte and identifying the RUI, a fourth block consisting of one byte and identifying the RUR, a fifth block consisting of two bytes and providing a cyclic redundant check, and a sixth block consisting of one byte and providing a quiet interval between said subpacket and an immediately following subpacket.

27. The method of claim 21, wherein the fourth transaction type comprises a second subpacket transmitted by the RUI, said subpacket consisting of six sequential digital blocks, a first block consisting of a 20-byte sequence of digital zeroes and enabling the MU and RUR to resynchronize to the RUI-transmitted second PRDS code, a second block consisting of one byte and identifying a resynchronization subpacket, a third block consisting of one byte and identifying the RUI, a fourth block consisting of one byte and identifying the RUR, a fifth block consisting of two bytes and providing a cyclic redundant check, and a sixth block consisting of one byte and providing a quiet interval between said subpacket and an immediately following subpacket.

28. The method of claim 21, wherein the fifth transaction type comprises a second subpacket transmitted by the RUI, said subpacket consisting of six sequential digital blocks, a first block consisting of four bytes and enabling the MU and RUR to synchronize to the RUI-transmitted second PRDS code, a second block consisting of one byte and informing the MU and RUR whether the RUI wishes to transmit additional data, a third block consisting of two bytes and informing the RUR and MU of the number of data bytes being transmitted, a fourth block having a variable length of between 0 bytes and 1600 bytes as specified by said third block and consisting of transmitted data, a fifth block consisting of two bytes and providing a cyclic redundant check, and a sixth block consisting of one byte and providing a quiet interval between said subpacket and an immediately following subpacket.

29. The method of claim 28, wherein the fifth transaction type further comprises a third subpacket transmitted by the RUR, said subpacket consisting of five sequential digital blocks, a first block consisting of four bytes and enabling the MU and RUI to synchronize to the RUR-transmitted second PRDS code, a second block consisting of one byte and identifying the RUR, a third block consisting of two bytes and acknowledging data receipt, a fourth block consisting of two bytes and providing a cyclic redundant check, and a fifth block consisting of one byte and providing a quiet interval between said subpacket and an immediately following subpacket.

30. The method of claim 18, wherein the communication medium is wireless radiofrequency propagation.

31. A DSSS TDMA network operating over a predetermined region within a frequency band including a predetermined lower limit frequency and a predetermined upper limit frequency, the network comprising:

a Master Unit node comprising a transceiver communicating via a communication medium, the transceiver comprising a radiofrequency portion and an analog portion, the radiofrequency portion comprising a data transmitter and at least one receiver, the analog portion comprising a master clock, the MU transceiver transmitting or receiving in accordance with a protocol for repetitively determining whether, when, and over what duration a network transceiver may transmit;

a plurality of Remote Unit nodes associated with the MU node, each RU node comprising a transceiver identical to the MU transceiver and communicating via said communication medium, each RU transceiver, when transmitting, transmitting in accordance with the protocol, each RU transceiver, when receiving, receiving in accordance with the protocol;

first link means for establishing a direct communication link from the MU to all RU's in the network;

second link means for establishing a direct communication link from an RU to the MU; and third link means for establishing a direct communication link from a first RU designated by the MU as a Remote Unit Initiator (RUI) to a second RU selected by the first RU and designated by the MU as a Remote Unit Recipient (RUR).

32. The network of claim 31, said first link means comprising:

a first DSSS subpacket transmitted, according to said protocol, within said frequency band by the MU data transmitter via said communication medium using a first PRDS code, the subpacket initialized with a preselected phase reference derived from the master clock time and consisting of a plurality of sequential digital blocks, each block consisting of a predetermined number of bytes, the first PRDS code generated continuously and repetitively at a predetermined chip-clock rate about one-half of the predetermined frequency bandwidth, the first PRDS code having a bit sequence length equal to the product of a first integer and a second integer, each complete sequence of the code generated over a predetermined time interval;

an RU radiofrequency portion comprising receiving means for receiving an MU-transmitted signal comprising the first PRDS code;

an RU code generator portion generating a PRDS code identical to the MU-transmitted first PRDS code;

said second link means comprising:

a second DSSS subpacket transmitted, according to said protocol, within said frequency band by the RU data transmitter via said communication medium using a second PRDS code, the subpacket consisting of a plurality of sequential digital blocks, each block consisting of a predetermined number of bytes, the second PRDS code generated continuously and repetitively at a predetermined chip-clock rate about one-half of the predetermined frequency bandwidth, the second PRDS code having a sequence length equal to the product of a third integer and a fourth integer, each complete sequence of the code generated over said predetermined time interval;

said MU radiofrequency portion comprising receiving means for receiving an RU-transmitted signal comprising the second PRDS code;

an MU code generator portion generating a PRDS code identical to the RU-transmitted second PRDS code;

said third link means comprising:

a third DSSS subpacket transmitted, according to said protocol, within said frequency band by the RUI data transmitter via said communication medium using said second PRDS code, the subpacket consisting of a plurality of sequential digital blocks, a block consisting of a predetermined, variable and selectable number of bytes;

an RUR radiofrequency portion comprising receiving means for receiving the RUI-transmitted second PRDS code signal;

an RUR code generator portion generating a PRDS code identical to the RUI-transmitted second PRDS code.

33. The network of claim 32, wherein said RU receiving means comprises at least one receiver, the receiver comprising:

means for down-converting the received MU-transmitted signal to an intermediate frequency signal;

means for generating and comparing radiofrequency signal strength of a plurality of intermediate frequency signals;

means for synchronizing the MU-transmitted first PRDS code with said RU-generated PRDS code; and means for demodulating an intermediate frequency signal.

34. The network of claim 31, wherein said MU receiving means comprises at least one receiver, the receiver comprising:
- means for down-converting the received RU-transmitted signal to an intermediate frequency signal;
- means for generating and comparing radiofrequency signal strength of a plurality of intermediate frequency signals;
- means for synchronizing the RU-transmitted second PRDS code with said MU-generated second PRDS code; and
- means for demodulating an intermediate frequency signal.

35. The network of claim 32, wherein said frequency band is 2400–2483.5 MHz, said first and third integers are each 1, and said second and fourth integers are each 32,768.

36. The network of claim 31, wherein said communication medium is wireless radiofrequency propagation.

37. A device for wireless transmission and reception of DSSS TDMA digital signals within a frequency band including a predetermined lower limit frequency and a predetermined upper limit frequency, the device comprising a radiofrequency portion comprising:
- a frequency generator generating continuously and repetitively at a first predetermined chip-clock rate about one-half the predetermined frequency bandwidth, a first PRDS code having a bit sequence length equal to the product of a first integer and a second integer, each complete sequence of the first code generated over a predetermined time interval, the frequency generator further generating continuously and repetitively at a second predetermined chip-clock rate evenly divisible into the first chip-clock rate by a factor which is a third integer, a second PRDS code having a bit sequence length equal to a fourth integer, each complete sequence of the second code generated over said predetermined time interval, each successive chip of the second PRDS code being in a predetermined one-to-one correspondence with a chip which is the leading chip of the chips comprising successive bits in the first PRDS code and separated by a number of chips equal to a fifth integer, a preselected and identifiable position in the first PRDS code being permanently aligned with a preselected and identifiable position in the second PRDS code;
- a pilot signal transmitter continuously transmitting the second PRDS code at a signal center frequency near a limit frequency of the frequency band; and
- a data signal transmitter intermittently transmitting a data-modulated first PRDS code signal at a signal center frequency near the center frequency of the frequency band.

38. The device of claim 37, wherein said preselected and identifiable position in the first PRDS code is the ALL1S position, and said preselected and identifiable position in the second PRDS code is the ALL1S position.

39. The device of claim 37, wherein said first integer is 1, said second integer is 32,768, said third integer is 32, said fourth integer is 1024, and said fifth integer is 32.

* * * * *